United States Patent
Kijima et al.

(10) Patent No.: US 9,902,304 B2
(45) Date of Patent: Feb. 27, 2018

(54) VEHICLE SEAT TRIM COVER FIXING STRUCTURE AND VEHICLE SEAT

(71) Applicant: TACHI-S CO., LTD., Akishima-shi, Tokyo (JP)

(72) Inventors: Yoshikazu Kijima, Akishima (JP); Hiroyuki Nozaki, Akishima (JP)

(73) Assignee: TACHI-S CO., LTD., Akishima, Tokyo (JP)

( * ) Notice: Subject to any disclaimer, the term of this patent is extended or adjusted under 35 U.S.C. 154(b) by 220 days.

(21) Appl. No.: 14/758,481

(22) PCT Filed: Dec. 26, 2013

(86) PCT No.: PCT/JP2013/084870
§ 371 (c)(1),
(2) Date: Jun. 29, 2015

(87) PCT Pub. No.: WO2014/129087
PCT Pub. Date: Aug. 28, 2014

(65) Prior Publication Data
US 2015/0336489 A1    Nov. 26, 2015

(30) Foreign Application Priority Data

Feb. 22, 2013   (JP) ................................ 2013-033442
Jul. 22, 2013   (JP) ................................ 2013-151486

(51) Int. Cl.
*B60N 2/58*   (2006.01)
*B60N 2/64*   (2006.01)
(Continued)

(52) U.S. Cl.
CPC ......... *B60N 2/5816* (2013.01); *B60N 2/4613* (2013.01); *B60N 2/5825* (2013.01);
(Continued)

(58) Field of Classification Search
CPC ...... B60N 2/4613; B60N 2/468; B60N 2/686; B60N 2/5816; B60N 2/5825; B60N 2/5883; B60R 5/006
See application file for complete search history.

(56) References Cited

U.S. PATENT DOCUMENTS 4,756,569 A * 7/1988 Trutter ................... B60N 2/366
                                                  296/37.16
4,786,103 A * 11/1988 Seibert ..................... B60N 2/70
                                                  297/452.38
(Continued)

FOREIGN PATENT DOCUMENTS

JP   04-107696 U   9/1992
JP   07-011655 Y2  3/1995
(Continued)

OTHER PUBLICATIONS

International Search Report (ISR) (PCT Form PCT/ISA/210), in PCT/JP2013/084870, dated Feb. 4, 2014.

*Primary Examiner* — David R Dunn
*Assistant Examiner* — Tania Abraham
(74) *Attorney, Agent, or Firm* — McGinn I.P. Law Group, PLLC.

(57) ABSTRACT

A trim cover fixing structure used in a vehicle seat 1 comprising a cushion body 16 having elasticity and a trim cover 17 covering the cushion body 16. This structure comprises engagement members 19a, 19b and 19c anchored near the edge of the trim cover 17, and an fixing member 23 provided with an engaging member (periphery 32) that engages with the engagement members 19a, 19b and 19c existing on the trim cover 17 in a state covering the cushion body 16. The fixing member 23 can apply tension to the trim cover 17 covering the cushion body 16 by engaging with the engagement members 19a, 19b and 19c, and in this state with tension applied, the trim cover 17 is anchored to the (Continued)

surface of the cushion body 16. This trim cover fixing structure has a simple structure and low cost and can apply desirable tension to the trim cover, and furthermore is easily applied to a vehicle seat having a split rear seat structure.

16 Claims, 29 Drawing Sheets

(51) Int. Cl.
    *B60N 2/68*     (2006.01)
    *B60N 2/46*     (2006.01)
    *B60R 5/00*     (2006.01)

(52) U.S. Cl.
    CPC ............ *B60N 2/5883* (2013.01); *B60N 2/64* (2013.01); *B60N 2/68* (2013.01); *B60N 2/686* (2013.01); *B60R 5/006* (2013.01)

(56) References Cited

U.S. PATENT DOCUMENTS

| | | | | |
|---|---|---|---|---|
| 5,096,256 | A * | 3/1992 | Mouri | B60N 2/4613 297/113 |
| 5,401,075 | A * | 3/1995 | Venuto | A47C 31/023 297/218.2 |
| 5,628,543 | A * | 5/1997 | Filipovich | B60N 2/4613 296/37.1 |
| 5,662,377 | A * | 9/1997 | Holdampf | B60N 2/3013 297/14 |
| 5,752,739 | A * | 5/1998 | Saeki | B60N 2/4613 297/113 |
| 5,816,640 | A * | 10/1998 | Nishimura | B60R 5/006 296/37.16 |
| 6,073,996 | A * | 6/2000 | Hatsuta | B60N 2/4613 156/213 |
| 6,398,284 | B1 * | 6/2002 | Butz | B60R 5/006 296/37.15 |
| 6,641,212 | B2 * | 11/2003 | Sitzler | B60R 5/006 224/275 |
| 7,152,899 | B2 * | 12/2006 | Hazlewood | B60R 5/006 296/24.43 |
| 7,611,184 | B1 * | 11/2009 | Bisson | B60R 5/006 296/37.15 |
| 7,731,293 | B1 * | 6/2010 | Donovan | B60N 2/686 297/452.18 |
| 2004/0140697 | A1 * | 7/2004 | Yuhki | B60N 2/4686 297/113 |
| 2006/0081670 | A1 * | 4/2006 | Sitzler | B60R 5/006 224/572 |
| 2010/0156163 | A1 * | 6/2010 | Daisuke | B60N 2/4613 297/452.2 |

FOREIGN PATENT DOCUMENTS

| | | |
|---|---|---|
| JP | 2000-184940 A | 7/2000 |
| JP | 2003-071160 A | 3/2003 |
| JP | 2003-071163 A | 3/2003 |
| JP | 2011-168115 A | 9/2011 |

* cited by examiner

M-M SECTIONAL VIEW

N-N SECTIONAL VIEW

ENLARGEMENT OF SECTION INDICATED BY ARROW P

ENLARGEMENT OF SECTION INDICATED BY ARROW Q

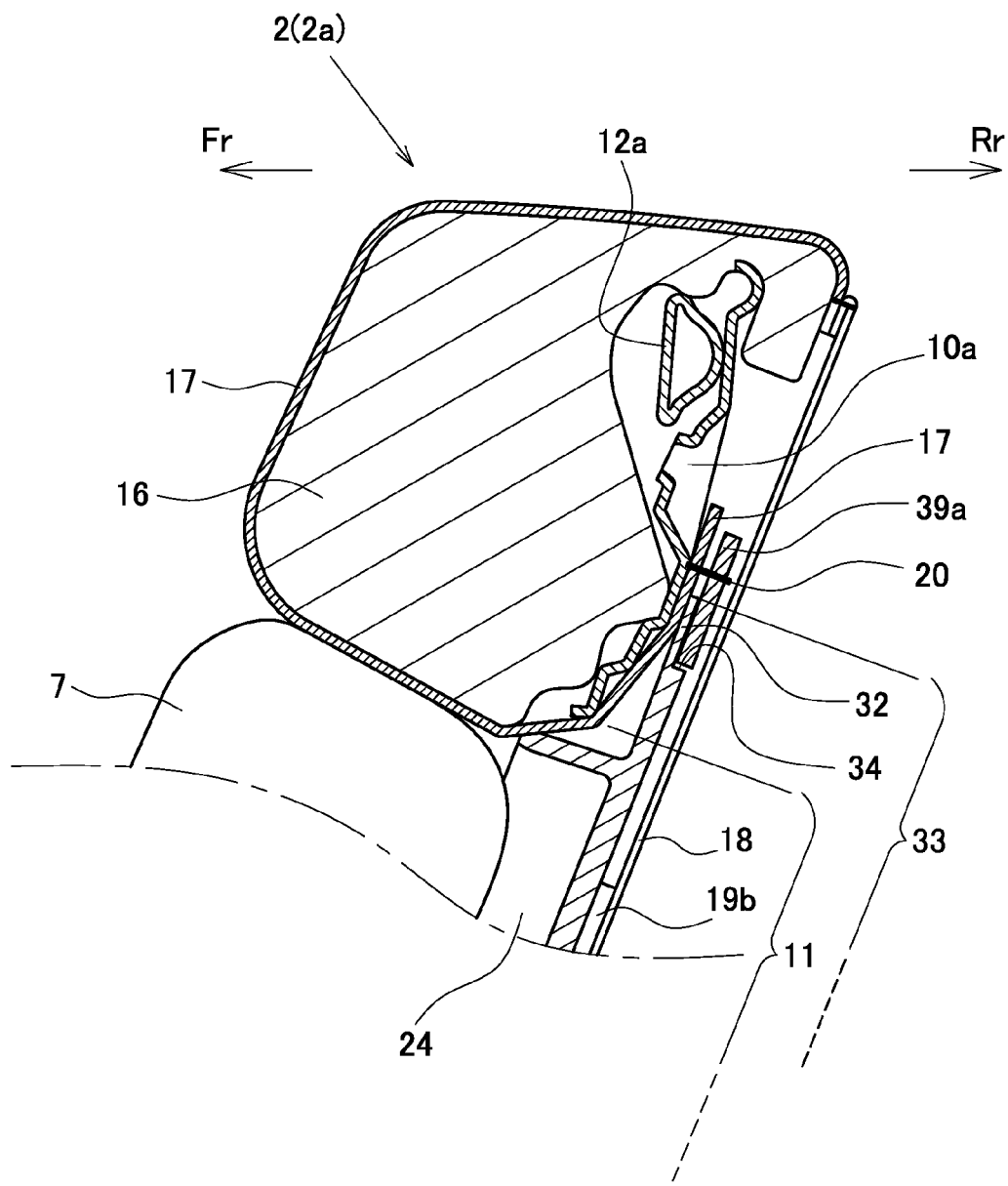

VEHICLE SEAT TRIM COVER FIXING STRUCTURE AND VEHICLE SEAT

TECHNICAL FIELD

The present invention relates to a trim cover fixing structure used in a vehicle seat having a structure covering a cushion body with a trim cover. In addition, the present invention relates to a vehicle seat using the trim cover fixing structure.

BACKGROUND ART

Forming the shape of a seat outline with a cushion body made of foam molding and/or the like and then forming a vehicle seat by covering the surface of the cushion body with a trim cover made of fur, synthetic leather, cloth and/or the like have been known from before. (For example, see Patent Literature 1, Patent Literature 2 and Patent Literature 3).

Patent Literature 1 discloses art in which the cushion body is mounted on the frame, an insert wire is provided within the cushion body, a locking plate is provided on the end of the skin (that is to say, the trim cover), and the trim cover is fixed to the frame by inserting the locking plate between the cushion body and the frame.

In this known art, an engagement structure of three members, namely the insert wire, the locking plate and the frame, was utilized, so there were problems such as costs being high, the structure being complex and the stretch condition of the skin (that is to say, the trim cover) being weak, and/or the like.

Patent Literature 2 discloses art in which the skin is fixed by an arm rest retainer having a special structure equipped with multiple protrusions being attached to the seat back frame, a hook member with a special structure having a trimming wire and/or the like being provided at the tip of the trim cover, and the hook member being hooked on the protrusions of the arm rest retainer.

In this known art, members having special structures must be used, so there were problems such as costs being high and the structure being complex. In addition, the structure consisted of only the tip of the trim cover being hooked on the arm rest retainer, so there were problems such as the stretch condition of the skin (that is to say, the trim cover) being weak.

Patent Literature 3 discloses art in which the skin material is fixed by a bag-shaped member being integrally formed on the inside of the pad (that is to say, the cushion body), the end of the skin material (that is to say, trim cover) being adhered to a terminal plate, and the terminal plate being inserted into the bag-shaped member.

In this known art, the bag-shaped member inside the pad (that is to say, the cushion body) must be formed with an integral form, so there are problems such as costs becoming high. In addition, the bag-shaped member and the terminal plate must be precisely formed, so there are problems such as costs becoming higher. Furthermore, the fixing structure consists of simply inserting the terminal plate into the bag-shaped member, so there were problems such as the stretch condition of the skin (that is to say, the trim cover) being weak.

Patent Literature 4 discloses a vehicle seat with a split rear seat structure. Specifically, a storage cavity for storing the arm rest is formed roughly in the center of the seat back and an opening is formed in one of the walls separating the passenger space from the cargo space, out of the walls forming that storage cavity, so that it is possible to store long objects such as skis and/or the like in both the cargo space and the passenger space by passing through this opening.

In Patent Literature 4, a vehicle seat equipped with a split rear seat structure as described above is disclosed, but no mention is made regarding an fixing structure for the trim cover. In addition, fixing structures for the trim cover are disclosed as described above in the above-described Patent Literature 1 through Parent Literature 3, but no mention is made of a split rear seat structure.

CITATION LIST

Patent Literature

PTL1: Japanese Utility Model Publication No. H07-011655
PTL2: Japanese Utility Model Laid-Open Publication No. H04-107696
PTL3: Japanese Patent Laid-Open Publication No. 2003-071160
PTL4: Japanese Patent Laid-Open Publication No. 2011-168115

SUMMARY OF INVENTION

Technical Problem

In consideration of the above-described problems in the fixing structure of conventional trim covers, it is an objective of the present invention to provide a trim cover fixing structure having a simple structure and low cost and with which it is possible to apply desirable tension to the trim cover.

In addition, it a further objective of the present invention to provide a trim cover fixing structure easily applicable to vehicle seats in which a storage cavity for storing arm rests and/or the like is formed.

Solution to Problem

The first vehicle seat trim cover fixing structure according to the present invention is a trim cover fixing structure used in a vehicle seat that comprises a cushion body having elasticity and a trim cover covering the cushion body; the trim cover fixing structure comprising: an engagement member provided near an edge of the trim cover; and an fixing member provided with an engaging section configured to engage with the engagement member on the trim cover in a state in which the cushion body is covered; wherein the fixing member is able to engage with the engagement member to apply tension to the trim cover covering the cushion body, and the trim cover is fixed to the surface of the cushion body in a state with the tension applied.

With the above-described first trim cover fixing structure, the fixing member is pressed against the engagement member anchored near the edge of the trim cover and furthermore the trim cover is stretched by the engagement member being pressed by the fixing member, and through this it is possible to anchor the trim cover to the cushion body. In this manner, the trim cover can be anchored through the action of simply pressing the engagement member by the fixing member, so it is possible to build the trim cover fixing structure extremely simply.

In addition, with the above-described first trim cover fixing structure, it is not necessary to provide an insert wire inside the cushion body and moreover the members used are only the engagement member and the fixing member, so it is possible to hold costs down.

In addition, with the above-described first trim cover fixing structure, the trim cover is fixed to the cushion body in a state with desirable tension applied to the trim cover, so it is possible to securely fix the trim cover.

Furthermore, with the above-described first trim cover fixing structure, the trim cover is fixed by the engagement member mounted near the edge of the trim cover used in a vehicle seat being pressed by an fixing member like a board (that is to say, a plate-shaped member), so when applied to a vehicle seat provided with a split rear seat structure, it is possible to easily apply the trim cover fixing structure to the split rear seat structure.

In the above-described first trim cover fixing structure, the fixing member may be a plate-shaped member that spreads out in a planar manner and at least the periphery of which is plate-shaped. Furthermore, the periphery of the plate-shaped member may engage with the engagement member.

The plate-shaped member may be formed by press processing metal or molding synthetic resin. By having a composition in which the fixing member is formed by a plate-shaped member and the engagement member is pressed by the periphery of that plate-shaped member, it is possible to fix the trim cover that is integral with the engagement member in a state with suitable tension applied.

In the above-described first trim cover fixing structure, it is possible for the periphery of the fixing member to engage with the engagement member in a state of being inserted between the engagement member and the trim cover. Through this composition, it is possible to prevent the engagement between the fixing member and the engagement member from coming apart, and it is possible to stably fix the trim cover over a lengthy time.

In the above-described first trim cover fixing structure, the fixing member may have a step in a section inserted between the engagement member and the trim cover. Furthermore, the engagement member may be inserted into this step. When the fixing member is inserted between the engagement member and the trim cover, the engagement member sticks out on the fixing member. As the amount of this sticking out becomes large, there may be cases in which a passenger feels uncomfortable when touching this section via a back surface carpet and/or the like, or for this to have a negative influence on quality as a vehicle seat. Regarding this, if the engagement member is housed by a step provided in the fixing member as in the present disclosure, it is possible to reduce the amount of sticking out of the engagement member on the fixing member, and as a result it is possible to enhance quality as a vehicle seat.

In the above-described first trim cover fixing structure, the step may be formed by a step indentation provided on the periphery of the fixing member. Furthermore, a wall section of the fixing member formed by the step indentation to restrict movement of the engagement member relative to the fixing member. With this composition, it is possible to prevent the engagement member from moving, by means of this wall section, and as a result, it is possible to prevent wrinkles from occurring in the trim cover.

In the above-described first trim cover fixing structure, the engagement member may be fixed to the trim cover by being sewn to the trim cover. This fixing structure does not require special fixing fixtures, fixing materials and/or the like, and thus is extremely economical.

In the above-described first trim cover fixing structure, the engagement member may be a narrow band-shaped member having a long side and a short side. Furthermore, the fixing member may engage with the long side of the band-shaped member. Through this composition, it is possible to effectively utilize a compactly shaped engagement member.

In the above-described first trim cover fixing structure, the engagement member may be made of felt, press felt or non-woven cloth. These materials can realize a good engagement state with a fixing member formed of metal or synthetic resin.

The above-described first trim cover fixing structure may further comprise a storage cavity that is a storage cavity formed with the trim cover covering the cushion body as a wall and is provided with an opening connecting the front region of the cushion body with the rear region of the cushion body, and a moving member movable between a position stored in the storage cavity and a position extending to the outside of the storage cavity. Furthermore, the trim cover may be provided so as to reach to the rear region of the cushion body from the front region of the cushion body through the storage cavity and the opening. Furthermore, the engagement member may be fixed on the trim cover in the section that reaches to the rear region of the cushion body. The fixing member may comprise a cover board configured to cover the opening of the storage cavity from the rear side of the cushion body. And the periphery of the cover board may engage with the engagement member when the cover board is placed at a position covering the opening of the storage cavity.

The above configuration is a vehicle seat having a so-called split rear seat structure to which the present invention is applied. The split rear seat structure is a structure in which an opening is formed in the vehicle seat provided between the cargo compartment and the passenger compartment, making it possible for long objects (for example, skis) to ride in both the cargo compartment and the passenger compartment through that opening.

According to this aspect of the present invention, it is possible to cause member (for example, the cover board) that covers the opening used for passing cargo in the split rear seat structure to function as the above fixing member, so it is basically possible for the vehicle seat that is a split rear seat structure to be put to use as a standard-type vehicle seat without a split rear seat structure extremely easily. In addition, conversely by using the frame member (the member the center section of which becomes the opening) in place of the member (for example, the cover board) covering the opening for passing cargo, it is possible to manufacture a vehicle seat with a split rear seat structure extremely easily.

In the trim cover fixing structure according to this invention used in a vehicle seat with a split rear seat structure, the engagement member may be fixed on the trim cover at the section that reaches to the rear region of the cushion body at least on both left and right sides of the opening provided in the storage cavity. Furthermore, the cover board that is a fixing member may engage with the engagement member in the periphery on both right and left sides, thereby applying tension to the trim cover.

With this construction, the cover board that is the fixing member presses reciprocally in both directions on the trim cover at positions on both sides of the opening used for the split rear seat, so it is possible to securely fix the trim cover at the perimeter of the opening used in the split rear seat structure.

In the trim cover fixing structure according to this invention used in a vehicle seat with a split rear seat structure, the moving member may be an arm rest and/or a side table. With this construction, it is possible to load long objects into the vehicle, passing through the opening formed in the storage cavity for storing the arm rest and/or the like.

Next, the second trim cover fixing structure according to the present invention is a trim cover fixing structure, comprising a cushion body with elasticity, a trim cover configured to cover the cushion body, and an opening configured to connect a front region of the cushion body with a rear region of the cushion body; wherein the trim cover is provided so as to reach to the rear region of the cushion body from the front region of the cushion body through the opening; an engagement member is provided near an edge of the trim cover reaching to the rear region of the cushion body; a cover board configured to cover the opening from the rear side of the cushion body is provided; an engaging member is provided in the cover board; tension is applied to the trim cover covering the cushion body by the engaging member engaging with the engagement member when the cover board is placed at a position covering the opening, and in the state with the tension applied, the trim cover is fixed to the surface of the cushion body; and the section of the trim cover that reaches to the rear region of the cushion body through the opening is a single frame shape surrounding the opening.

With the second trim cover fixing structure, the section of the trim cover reaching the rear region of the cushion body through the opening is a single frame shape surrounding the opening, so it is possible for the trim cover stretched to the rear region (that is to say, the back side region) of the opening to maintain a constant shape in a natural state, so that the shape does not collapse. Consequently, after the trim cover is stretched to the rear region of the opening, the work of mounting the cover board on the opening via the trim cover is accomplished extremely easily.

In the above configuration, the combination of the "engagement member of trim cover" and the "engaging member of cover board" may for example be realized through a combination of "an engagement member sewn into the trim cover" and "the periphery of the cover board", a combination of "a hook or clip anchored to the trim cover" and "a hole provided in the cover board", a combination of "a hole provided in the trim cover" and "a protrusion provided in the cover board", and/or the like. The above "hook or clip" is a component of arbitrary shape capable of engaging with the cover board.

In the second trim cover fixing structure, the section of the trim cover that reaches to the rear region of the cushion body through the opening may be mutually sewn together and form a single frame shape surrounding the opening. The method of sewing is a reliable method with regard to not collapsing the shape of the trim cover while being simple.

In the second trim cover fixing structure, the cushion body may be supported by a frame, and a connecting member may be provided at the section of the trim cover that reaches to the rear section of the cushion body through the opening. Moreover, the connecting member may be connected to the frame. Through this configuration, it is possible for the trim cover to be provisionally attached to the frame, so that it is easy to accomplish processes accomplished on the trim cover thereafter.

In the second trim cover fixing structure, an opening hole may be provided in a section to the outside of the engagement member, at the section of the trim cover that reaches to the rear section of the cushion body through the opening. With this configuration, it is possible to easily accomplish the work of causing the cover board to engage with the engagement member by hooking the hook member of an opening tool equipped with a hook member into the opening hole and opening the trim cover by means of the opening tool.

Next, the vehicle seat according to the present invention is a vehicle seat comprising a cushion body having elasticity, a trim cover for covering the cushion body, and a trim cover fixing structure configured to fix the trim cover to the cushion body, wherein the trim fixing structure is the above-described first or second trim cover fixing structure. With this vehicle seat, it is possible to similarly obtain the effects obtained with the trim cover fixing structure according to the present invention.

Advantageous Effects of Invention

With the above-described first and second trim cover fixing structures and the vehicle seats using such according to the present invention, the following effects (1) through (5) can be obtained.

(1) By pressing the engaging section of an fixing member (for example, a cover board) onto the engagement member provided near the end of the trim cover, and also pressing the engagement member by means of the fixing member to stretch the trim cover, it is possible to fix the trim cover to the cushion body. In this manner, it is possible to fix the trim cover through the action of simply pressing the engagement member with the fixing member, so it is possible to make the trim cover fixing structure extremely simple.

(2) Because it is not necessary to provide a special member such as an insert wire and/or the like inside the cushion body using insert technology and moreover because the members used are only the engagement member and the fixing member (for example, a cover board), it is possible to keep costs low.

(3) Because the trim cover is fixed to the cushion body in a state with the preferable tension applied to the trim cover, it is possible to securely fix the trim cover.

(4) Because the trim cover is fixed by pressing on the engagement member provided near the end of the trim cover used in the vehicle seat with an fixing member such as a board (that is to say, a plate-shaped member) or the engaging member of the cover board, when an apparatus provided with a split rear seat structure is utilized as the vehicle seat, it becomes possible to easily apply the fixing structure of the trim cover to the split rear seat structure.

(5) Furthermore, with the second trim cover fixing structure, a section that reaches to the back region of the cushion body through an opening of the trim cover has an integral frame shape surrounding that opening, so it is possible for the trim cover stretched to the back region (that is to say, the rear-side region) of the opening to maintain a fixed shape in a natural state, so that shape does not collapse. Consequently, the work of mounting the cover board on the opening via the trim cover after pulling the trim cover to the back region of the opening becomes very easy.

BRIEF DESCRIPTION OF DRAWINGS

FIG. 18 is a sectional view showing the necessary components of another embodiment of the vehicle seat and trim cover fixing structure according to the present invention;

REFERENCE SIGNS LIST

Figure 1:
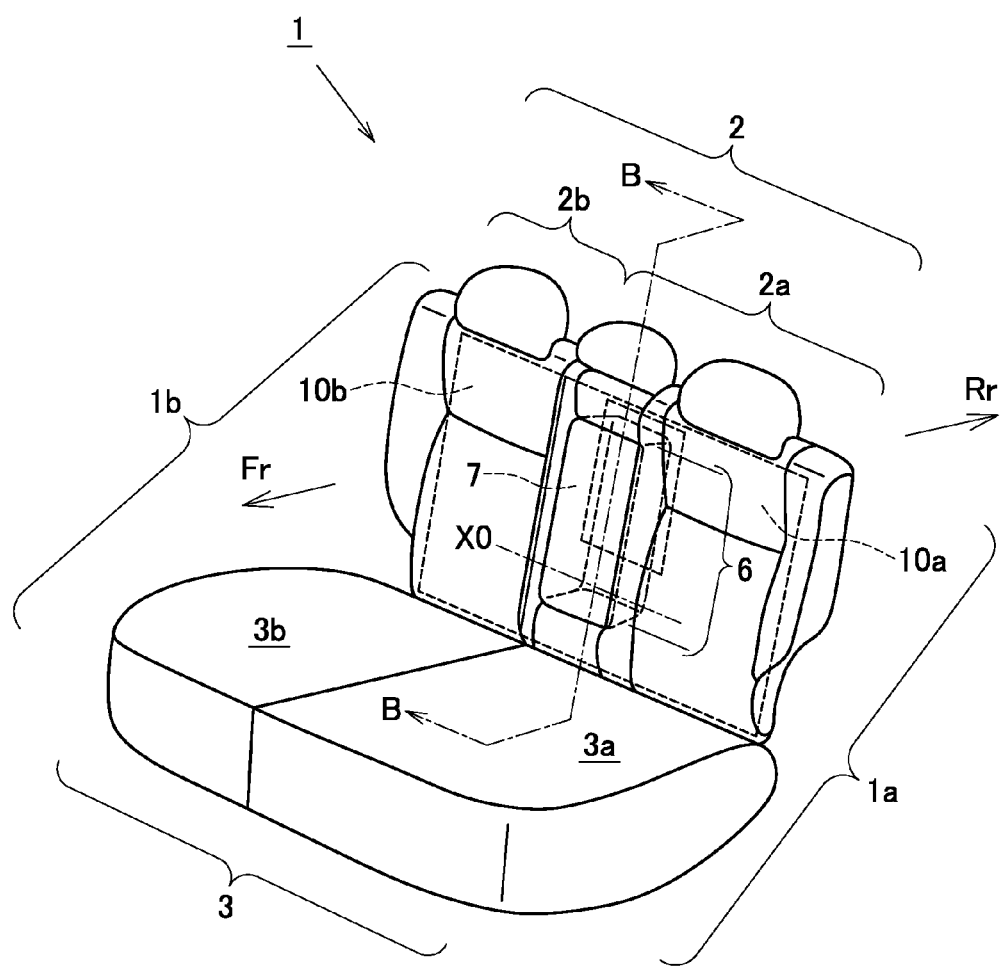
FIG. 1 is a perspective view showing an embodiment of a vehicle seat and trim cover fixing structure according to the present invention.

1. Rear seat (vehicle seat), 1a. Two-person rear seat, 1b. One-person rear seat, 2. Seat back, 2a. Two-person seat back, 2b. One-person seat back, 3. Seat cushion, 3a. Two-person seat cushion, 3b. One-person seat cushion, 6. Arm rest storage cavity, 6a. Cushion body cavity, 7. Arm rest (movable member), 10a,10b. Frame, 11. Opening, 12a,12b. Pipe frame, 13. Shaft member, 16. Cushion body, 17. Trim cover, 18. Back surface carpet, 19a,19b,19c. Engagement member. 19x. Tip vicinity, 20. Thread, 21. Attachment hole, 22. Hook member (connecting member), 23. Cover board (fixing member), 24. Wall, 25a,25b. Coupling hook, 26. Protrusion, 27. Position-determining hole, 28. Engagement protrusion, 29. Frame, 30. Engagement hole, 31. Lid, 32. Cover board periphery (engaging member), 33. Cover board (fixing member), 34. Step, 35. Support shaft, 36,37. Hole, 38. Shaft housing unit, 39a,39b,39c. Engagement member, 40. Step indentation or groove, 43. Cover board (fixing member), 45. Opening hole, 46. Hook member, 47. Opening tool, Fr. Front, L0. Length of step indentation or groove, Rr. Rear, X0. Center of rotation

DESCRIPTION OF EMBODIMENTS

First Embodiment of the Trim Cover Fixing Structure and Vehicle Seat According to the Present Invention Now, the trim cover fixing structure and vehicle seat according to the present invention will be described below based on preferred embodiments. It is apparent that the present invention is not limited to the embodiments. In the drawing accompanying the present specification, constituent elements are sometimes shown at a scale that is different from the actual scale thereof in order to facilitate understanding of characteristic portions.

(Overall Configuration)

Figure 2:
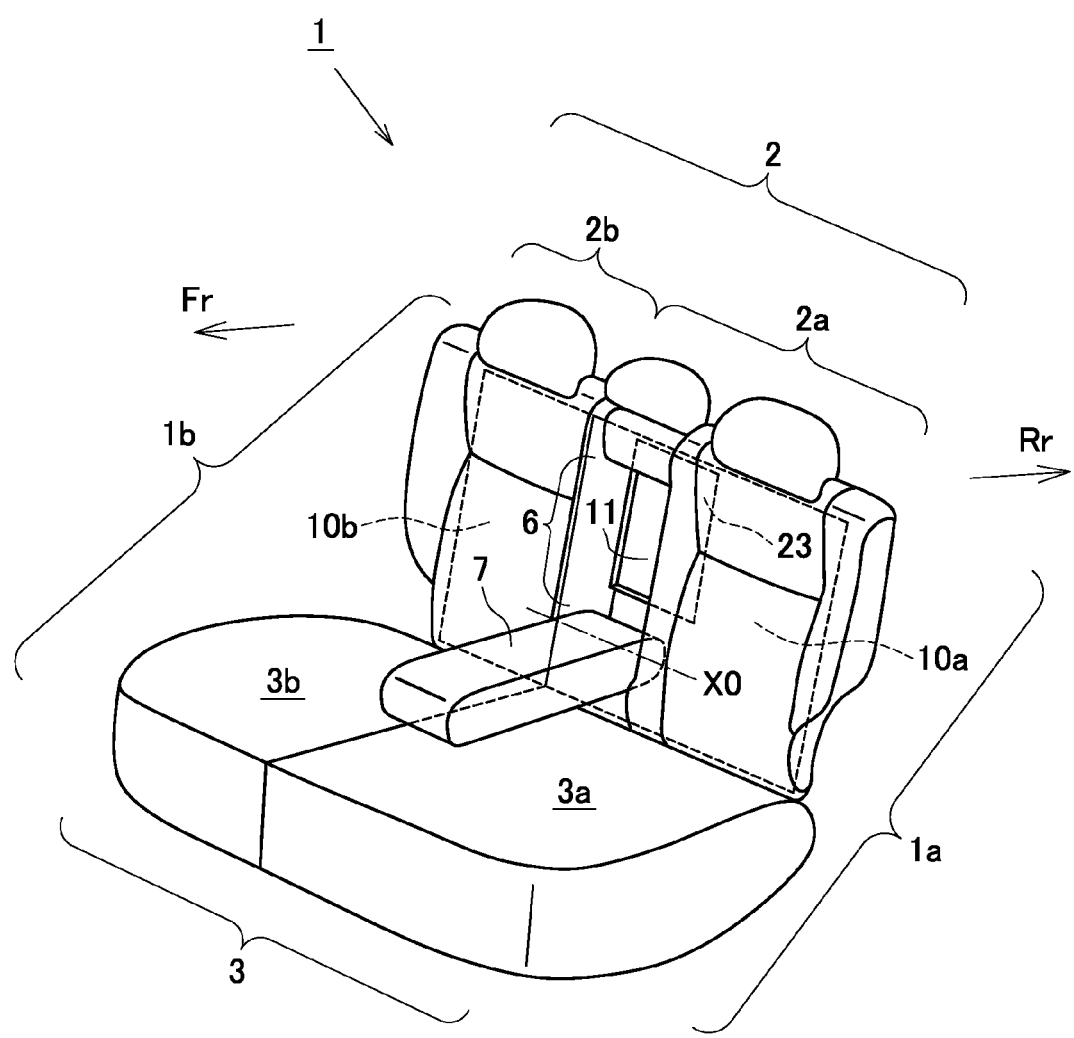
FIG. 2 is a perspective view showing the state with an arm rest pulled out in the vehicle seat of FIG. 1.
Figure 3:
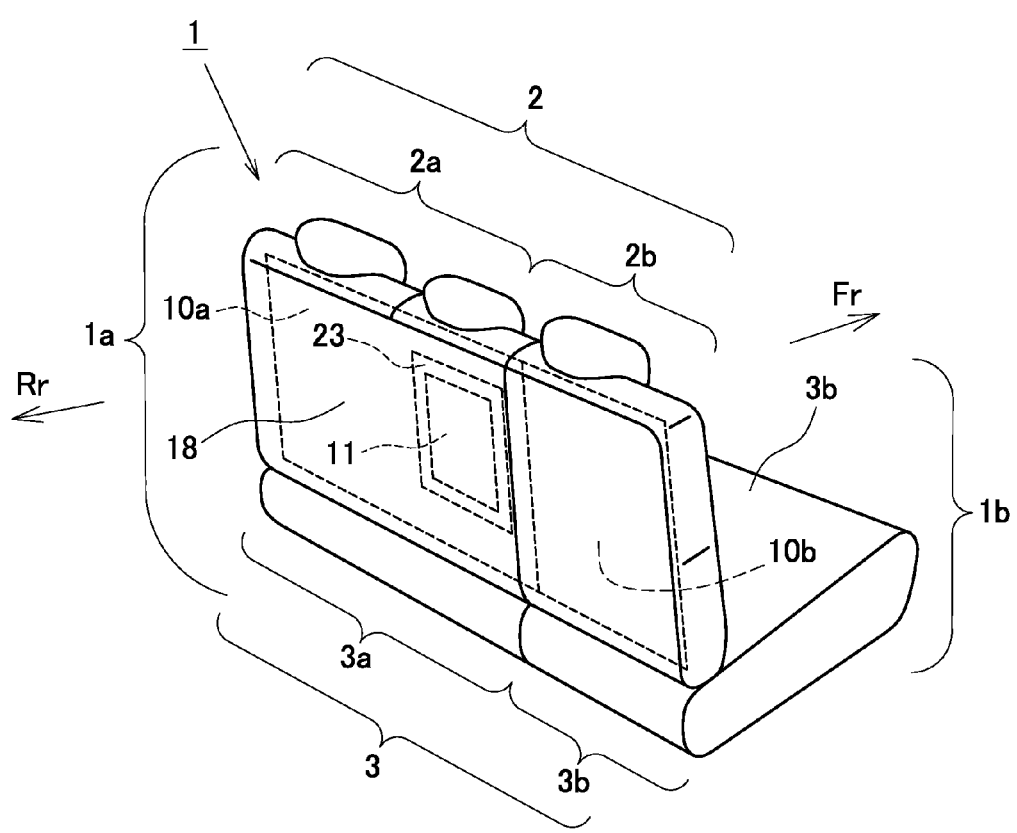
FIG. 3 is a perspective view showing the structure of the back side of the vehicle seat of FIG. 1.

FIG. 1 and FIG. 2 show external views of the front side (that is to say, the passenger compartment side) of the rear seat of an automobile that is an embodiment of the vehicle seat according to the present invention. FIG. 1 shows an arm rest, which is a component on which a rider (not shown) can rest an arm, being stored in a prescribed position in an unused state. FIG. 2 shows the arm rest being tipped over to the front and exposed in a used state. FIG. 3 shows an external view of the rear side (that is to say, the cargo compartment side) of the rear seat. In these drawings, an arrow Fr indicates the front of the vehicle and an arrow Rr indicates the rear of the vehicle.

In these drawings, the rear seat as a vehicle seat with the entirety indicated by the reference sign 1 possesses a seat back 2 against which a sitting person can lean his back, and a seat cushion 3 that is the part on which a sitting person can place his bottom. In addition, the rear seat 1 comprises a two-person seat section 1a and a one-person seat section 1b. The surface area ratio of two-person seat section 1a to the one-person seat section 1b is six to four.

The two-person rear seat 1a comprises a two-person seat back 2a and a two-person seat cushion 3a. The one-person seat 1b comprises a one-person seat back 2b and a one-person seat cushion 3b.

As shown in FIG. 2, a cavity 6 for storing an arm rest and an arm rest 7 as a movable member are provided on the edge in a transverse direction of the two-person seat back 2a (that is to say, roughly in the center of the seat back 2 as a whole). The arm rest 7 is movable (in the present embodiment, is rotatable about a roughly horizontal center line X0) between a storage position stored inside the storage cavity 6 (see FIG. 1) and a usage position that is a roughly horizontal state on the outside of the storage cavity 6 (see FIG. 2).

As shown in FIG. 3, a frame 10a and a frame 10b are provided inside the seat back 2. The frame 10a is the frame corresponding to the two-person seat back 2a. The frame 10b is the frame corresponding to the one-person seat back 2b. These frames 10a and 10b are made of metal, hard synthetic resin and/or the like.

Figure 4:
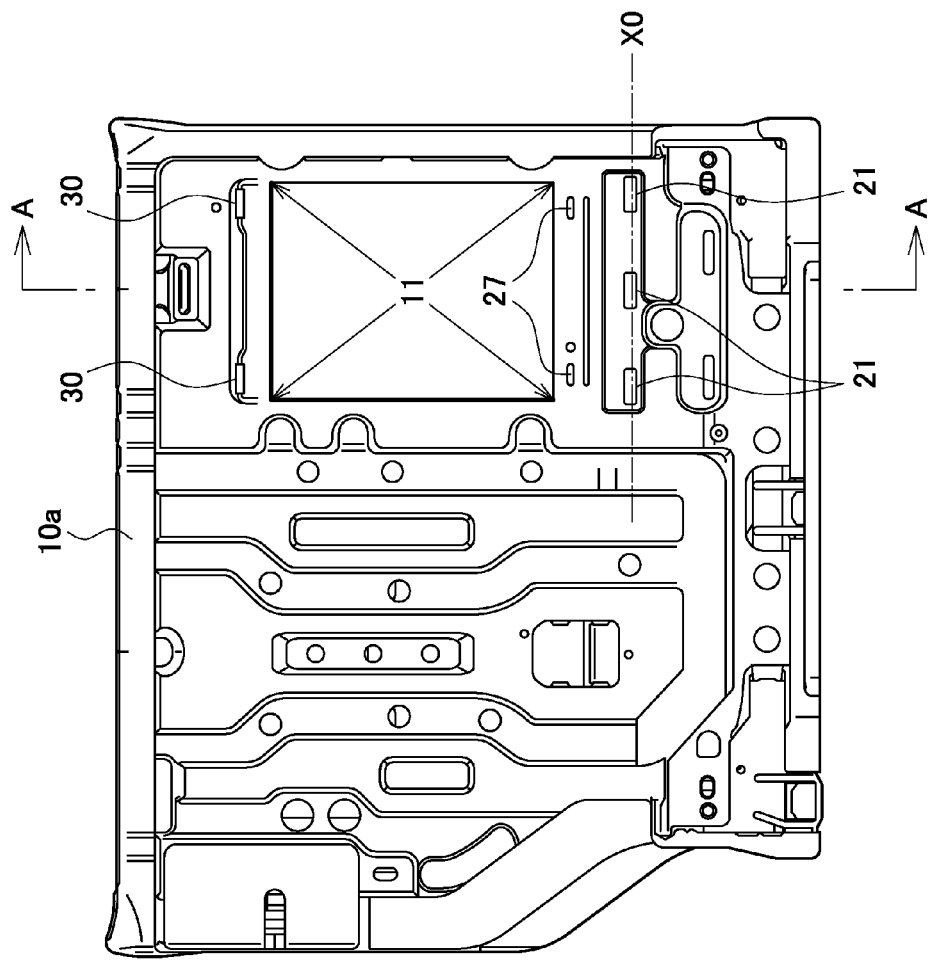
FIG. 4 is a plan view showing a frame provided inside the vehicle seat shown in FIG. 3.
Figure 5:
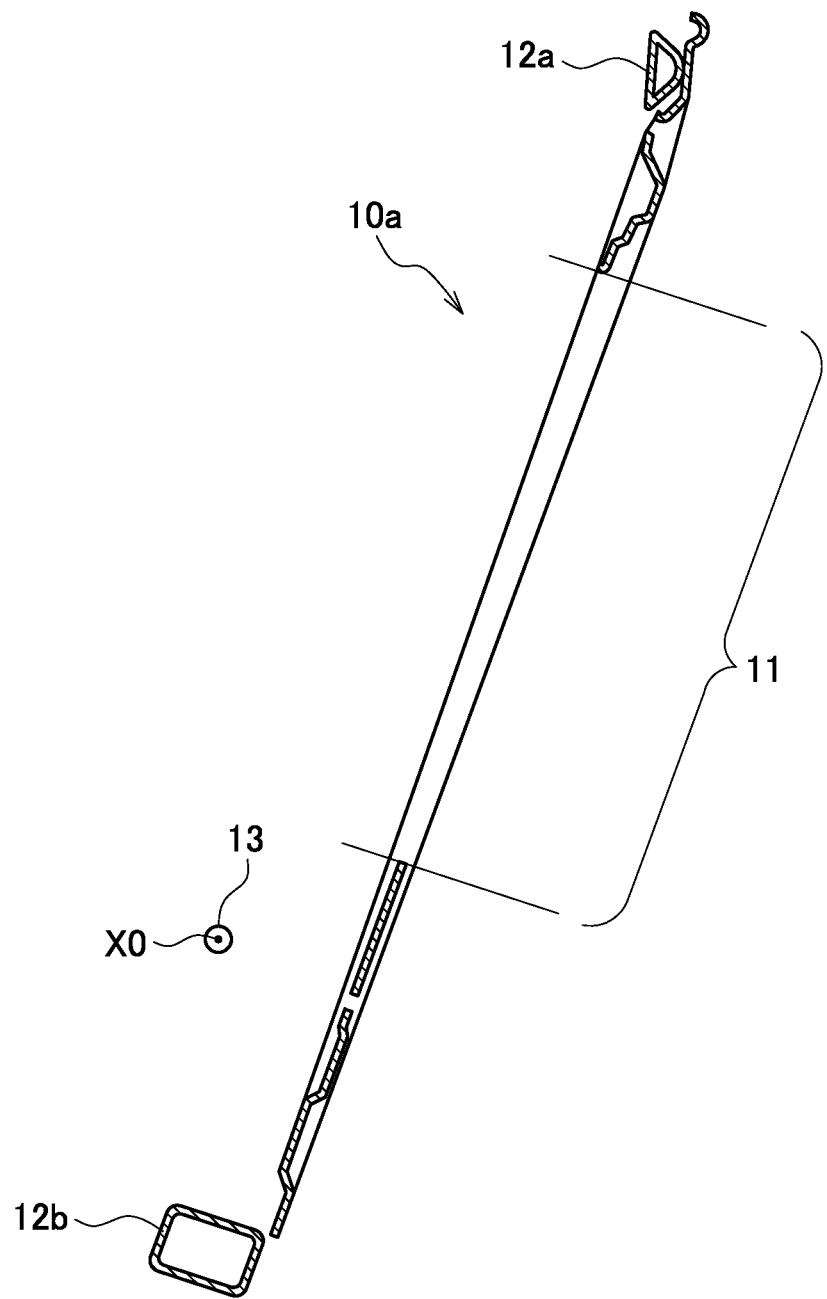
FIG. 5 is a sectional view along line A-A in FIG. 4.

The frame 10a has a planar structure shown in FIG. 4 and a cross-sectional structure shown in FIG. 5. FIG. 4 shows the frame 10a in a state as viewed from the cargo compartment side (the side of the region in the direction of the arrow Rr) of FIG. 1. FIG. 5 is a sectional view along line A-A in FIG. 4. As shown in these drawings, the frame 10a is formed in a thin board shape, that is to say a panel shape. In FIG. 4, an opening 11 is formed in a section to the right side of the center of the frame 10a. In FIG. 5, references signs 12a and 12b indicate pipe frames that are integral with the frame 10a. A reference sign 13 indicates a shaft member, which is a shaft member for composing the center of rotation X0 of FIG. 1. This shaft member 13 is provided integrally with the frame 10a.

(Cross-Sectional Structure of Seat Back)

Figure 6:
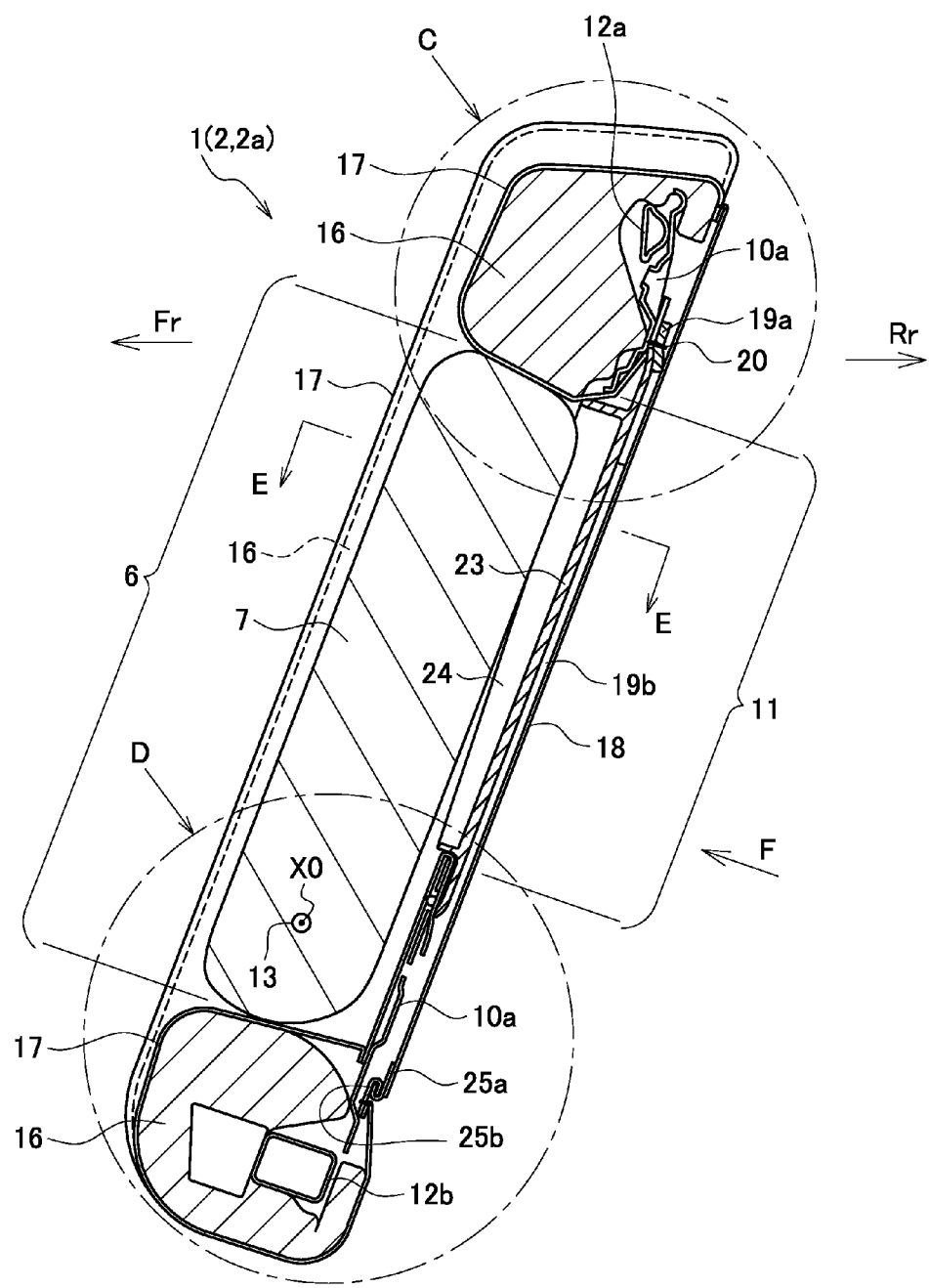
FIG. 6 is a sectional longitudinal view of the seat back along line B-B in FIG. 1.
Figure 7:
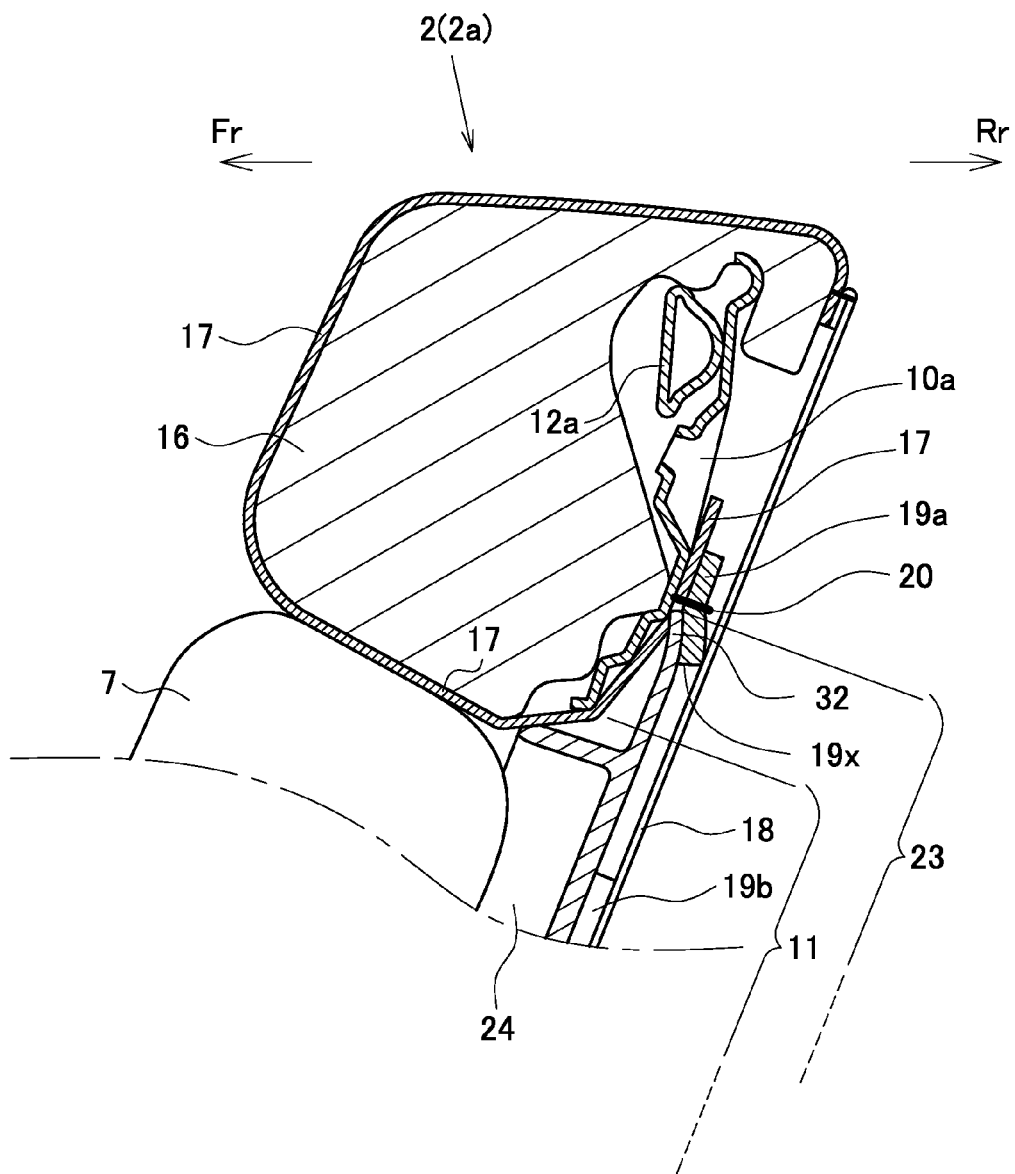
FIG. 7 shows an enlargement of the section indicated by arrow C in FIG. 6.
Figure 8:
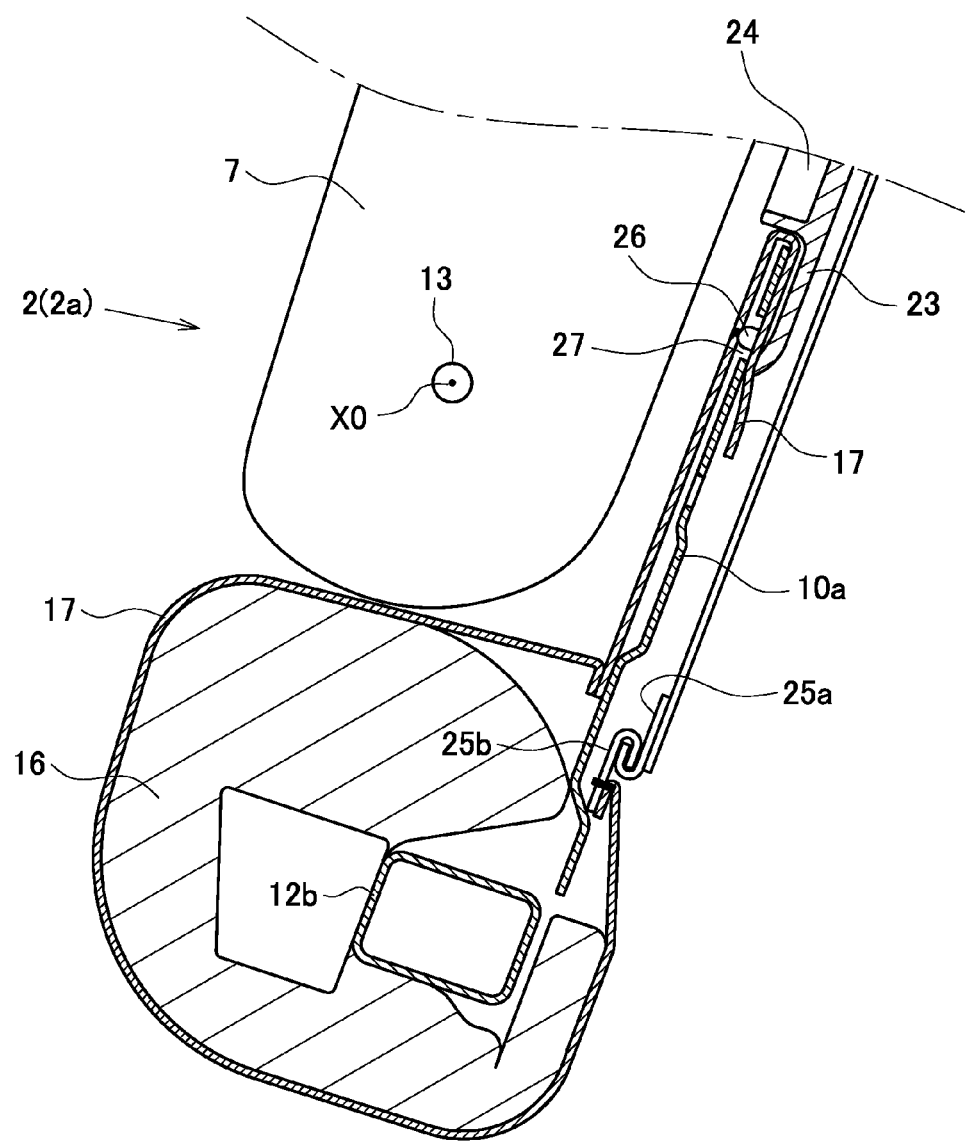
FIG. 8 shows an enlargement of the section indicated by arrow D in FIG. 6.
Figure 9:
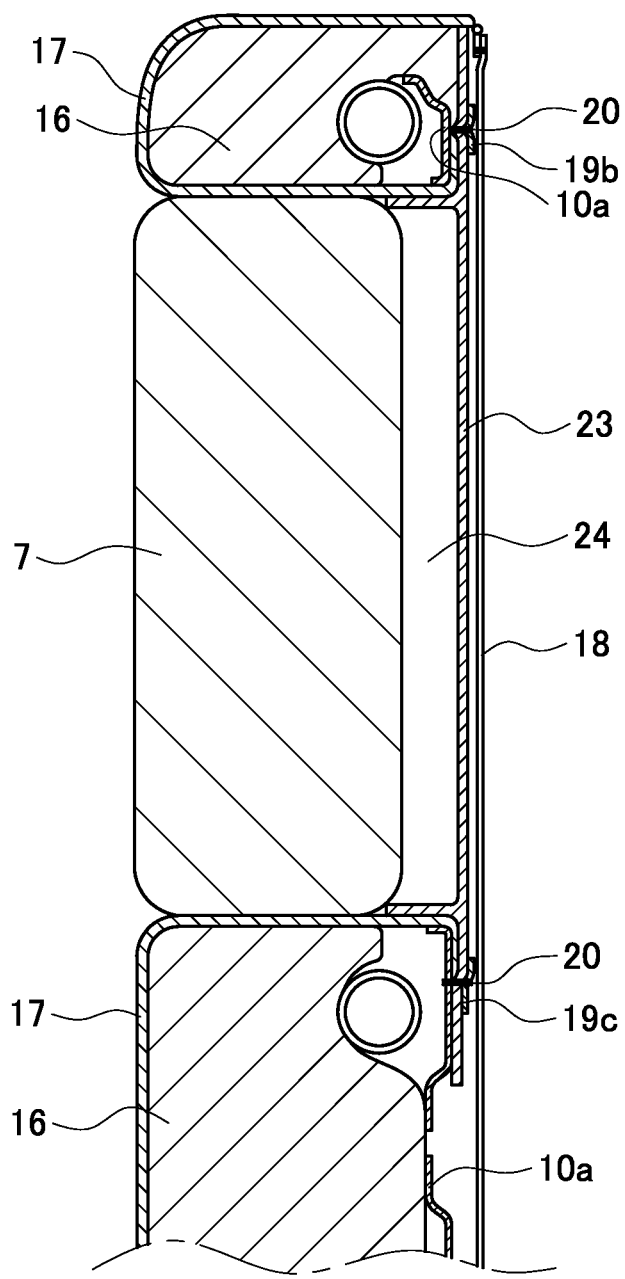
FIG. 9 is a sectional plan view along line E-E in FIG. 6.

FIG. 6 is a sectional longitudinal view of roughly the center section (that is to say, the section in which the arm rest 7 is provided) in the left-right direction of the seat back 2 along line B-B of FIG. 1. FIG. 7 is an enlargement of the section indicated by an arrow C in FIG. 6 (that is to say, the top of the seat back 2). FIG. 8 is an enlargement of a section indicated by an arrow D in FIG. 6 (that is to say, the bottom of the seat back 2). FIG. 9 is a sectional plan view taken along line E-E in FIG. 6.

Figure 10:
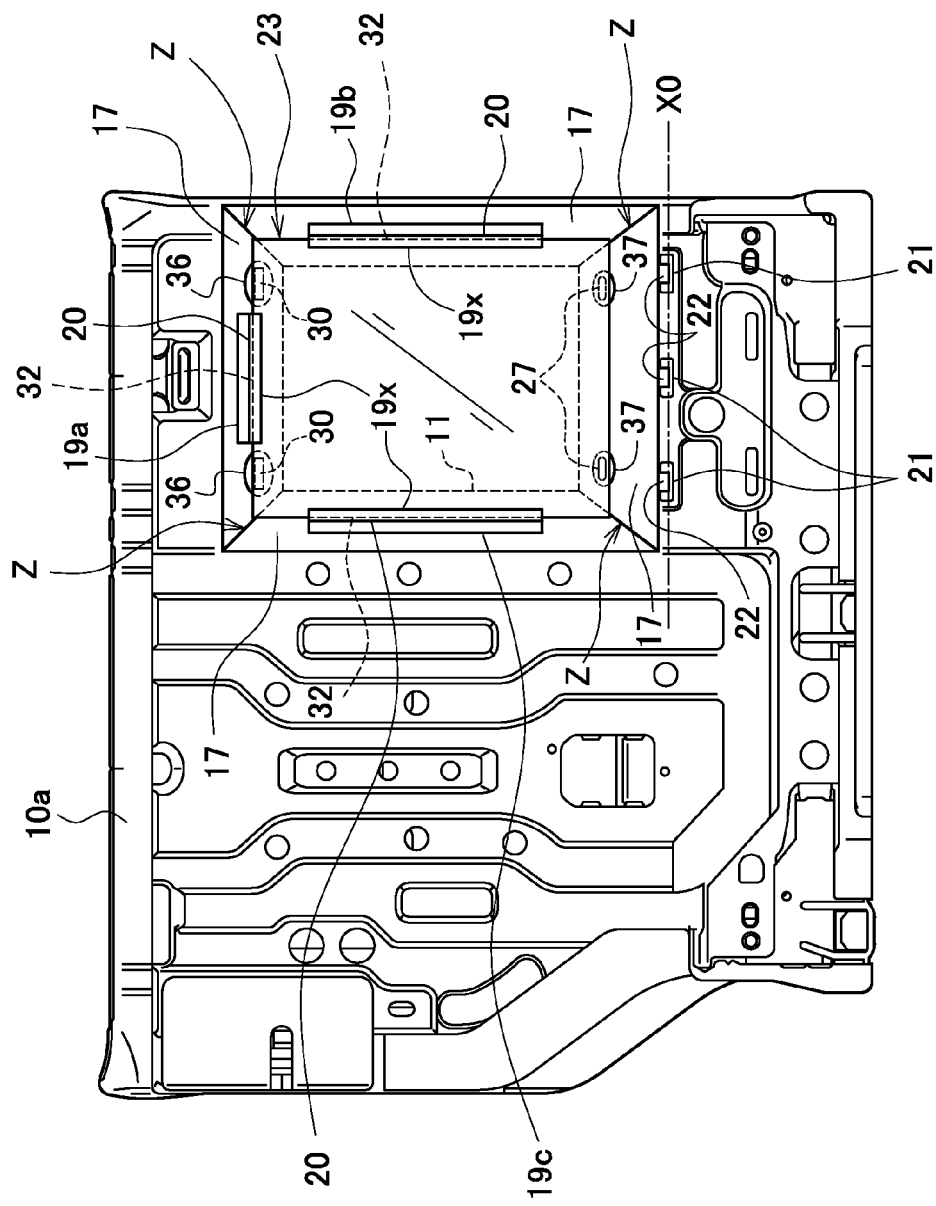
FIG. 10 is a plan view showing a frame in accordance with arrow F in FIG. 6.

FIG. 10 shows the condition of the frame 10a (see FIG. 4 and FIG. 5) as viewed from the arrow F direction in FIG. 6. In FIG. 10, illustration of various components provided around the frame 10a is omitted in order to make the composition related to the frame 10a easy to understand. FIG. 10 and FIG. 4 differ on the following points. That is to say, FIG. 4 shows the frame 10a itself, while FIG. 10 shows the state after a prescribed process has been implemented on the opening 11 shown in FIG. 4.

Figure 11:
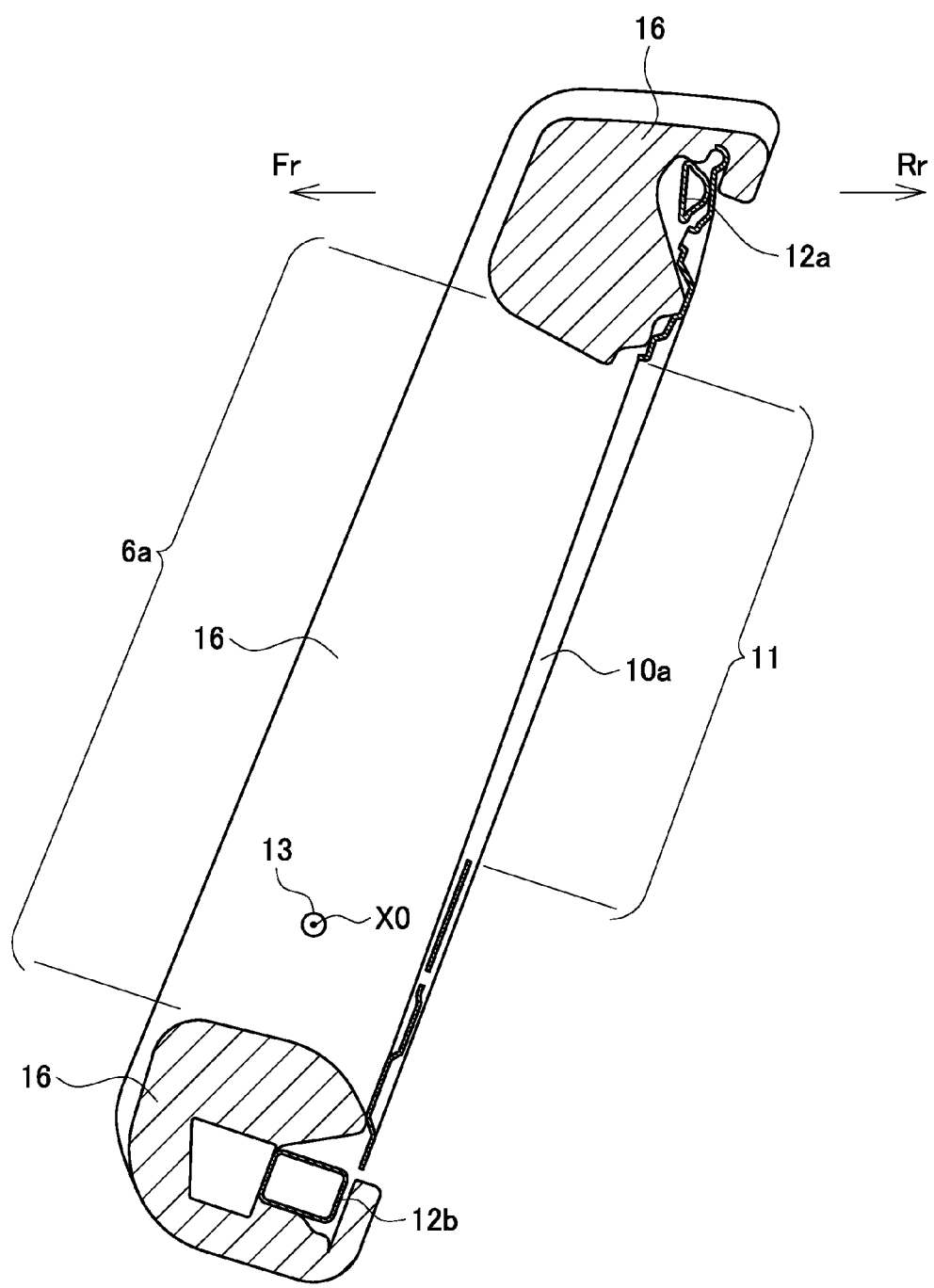
FIG. 11 is a sectional view showing the state when the cushion body is adhered to a frame, being the primary section of FIG. 6.

In FIG. 6, a cushion body 16 is adhered for example by adhesion and/or the like to the front surface of the frame 10a. The cushion body 16 is made of a material having elasticity, for example a foam molding material. The state in which the cushion body 16 is adhered to the frame 10a is as shown in FIG. 11. In FIG. 11, a cushion body cavity 6a is formed in the front of the frame 10a (the direction indicated by the arrow Fr) with the cushion body 16 as a wall. This cushion body cavity 6a is spatially linked with the forward region (the region in the direction indicated by the arrow Fr) of the cushion body 16. In addition, the cushion body cavity 6a is linked to the rearward region of the cushion body 16 (the region in the direction indicated by the arrow Rr) via the opening 11 provided in the frame 10a.

Referring again to FIG. 6, the surface of the cushion body 16 is covered by a trim cover 17. The trim cover 17 is made of fur, synthetic leather, cloth or a material equivalent to these, or a combination of these. In addition, a back surface carpet 18 is installed on the rear surface of the seat back 2. The back surface carpet 18 is also made of fur, synthetic leather, cloth or a combination of these. As indicated by arrow G in FIG. 12 and FIG. 13, the trim cover 17 is pulled to the middle of the cushion body cavity 6a from the front side (Fr direction) of the cushion body 16, and moreover, is stretched toward the back side (Rr direction) of the cushion body 16 via the opening 11 in the frame 10a. In this manner, the trim cover 17 covers the cushion body 16. Furthermore, the storage cavity 6 is formed by the trim cover 17 that covers the cushion body 16. This storage cavity 6 is a cavity for storing the arm rest 7 (see. FIG. 1 and FIG. 2).

Figure 13:
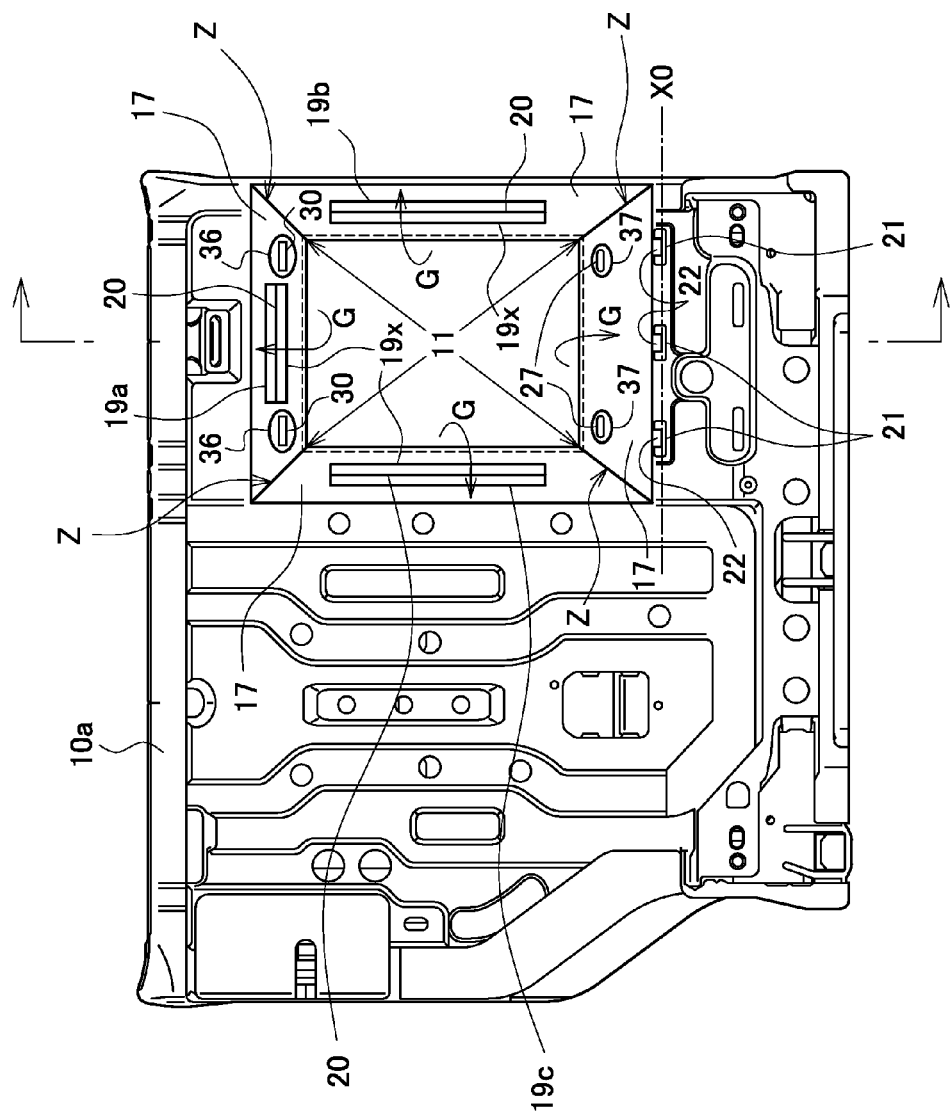
FIG. 13 is a plan view showing a frame in accordance with arrow K of FIG. 12.

In FIG. 13, the four corners Z of the part of the trim cover 17 stretched over the back (the side toward the viewer in FIG. 13) of the opening 11 are sewn together in advance. Through this, the part of the trim cover 17 stretched on the back of the opening 11 is formed integrally with a frame shape (a rectangular shape in this embodiment) surrounding the opening 11. In addition, on the edge on the bottom side of the part of the trim cover 17 stretched over the rear of the opening 11, hook members 22 are sewn on in advance or are attached through another method as multiple connecting members.

On the other hand, in FIG. 4, a plurality (three in this embodiment) of attachment holes 21 are provided as connecting members in downward positions of the opening 11 of the frame 10a. As shown in FIG. 13, after the trim cover 17 is stretched onto the back of the opening 11, the hook members 22 on the bottom edge of the trim cover 17 are hooked into (that is to say, connected to) attachment holes 21 of the frame 10. Through this, the trim cover 17 is provisionally attached to the back surface of the frame 10a, making processes accomplished on the trim cover 17 thereafter easy to do.

The four corners Z in some cases need not be sewn together. In such cases, the part of the trim cover 17 stretched over the back of the opening 11 does not maintain a single frame shape. In addition, depending on the case, the hook members 22 need not be provided on the trim cover 17, and the attachment holes 21 need not be provided in the frame 10a.

Engagement members 19a, 19b and 19c (19c is illustrated in FIG. 13) are fixed in advance at positions near the edge of the trim cover 17 which is stretched to the rear (Rr direction) side of the cushion body 16. As shown in FIG. 13, the engagement member 19a is an engagement member positioned in an upward position on the opening 11. In addition, the engagement members 19b and 19c are engagement members positioned in positions on both the left and right sides of the opening 11, as shown in FIG. 13 and FIG. 9.

The engagement members 19a, 19b and 19c are made for example of a material having stiffness and elasticity, for example felt, press felt, non-woven cloth or equivalents of these. In this embodiment, the engagement members 19a, 19b and 19c are sewn to and fixed to the trim cover 17 by thread 20 roughly in the center of the engagement members, as shown in FIG. 13 and FIG. 7. Because the engagement members 19a, 19b and 19c are fixed to the trim cover 17 by thread 20 sewn roughly in the middle of the engagement members, the side edge 19x (that is to say, the side edge along the longer side) thereof that is parallel to the thread 20 is supported by the trim cover so as to be free to oscillate or pivot in resistance to the members' own elasticity, centered on the thread 20.

Figure 14:
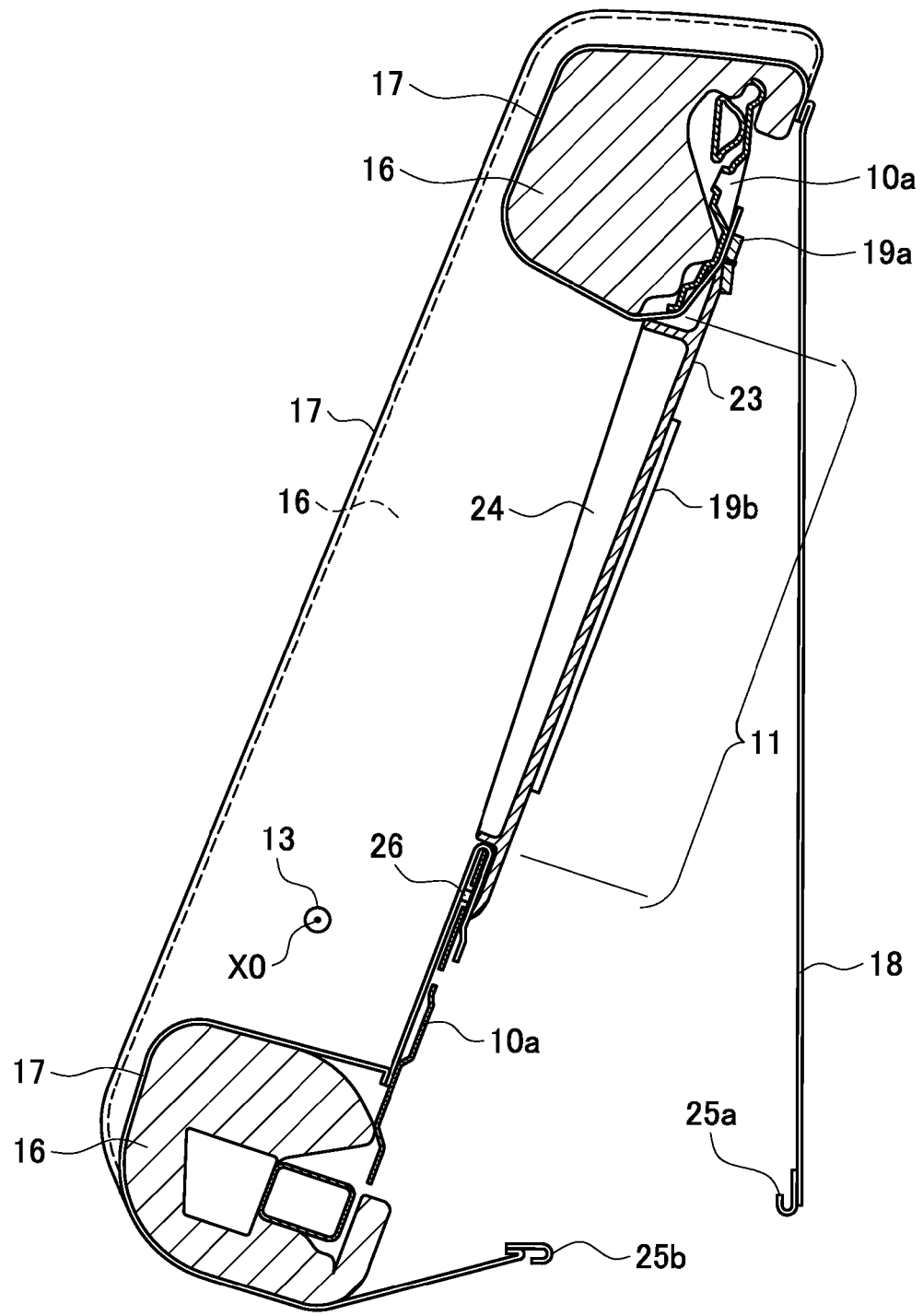
FIG. 14 is a sectional view showing the state when the cover board is mounted on the back surface of the seat back according to FIG. 12.

In FIG. 6, a cover board 23 is inserted as an fixing member into the opening 11 of the frame 10a from the rear (the arrow Rr direction) side of the seat back 2. Insertion of the cover board 23 is accomplished prior to the back surface carpet 18 being coupled with the trim cover 17 on the bottom edge by a first coupling hook 25a and a second coupling hook 25b as coupling members (that is to say, while the two hooks 25a and 25b are unhooked), as shown in FIG. 14. After the cover board 23 is inserted into the opening 11, the back surface carpet 18 is affixed to the rear surface of the seat back 2 as shown in FIG. 6, by the two hooks 25a and 25b being mutually coupled as shown in FIG. 8. Through this, the composition is such that the inside of the seat back 2 cannot be seen from the back side (that is to say, the cargo compartment side).

(Cover Board)

Figure 15A:
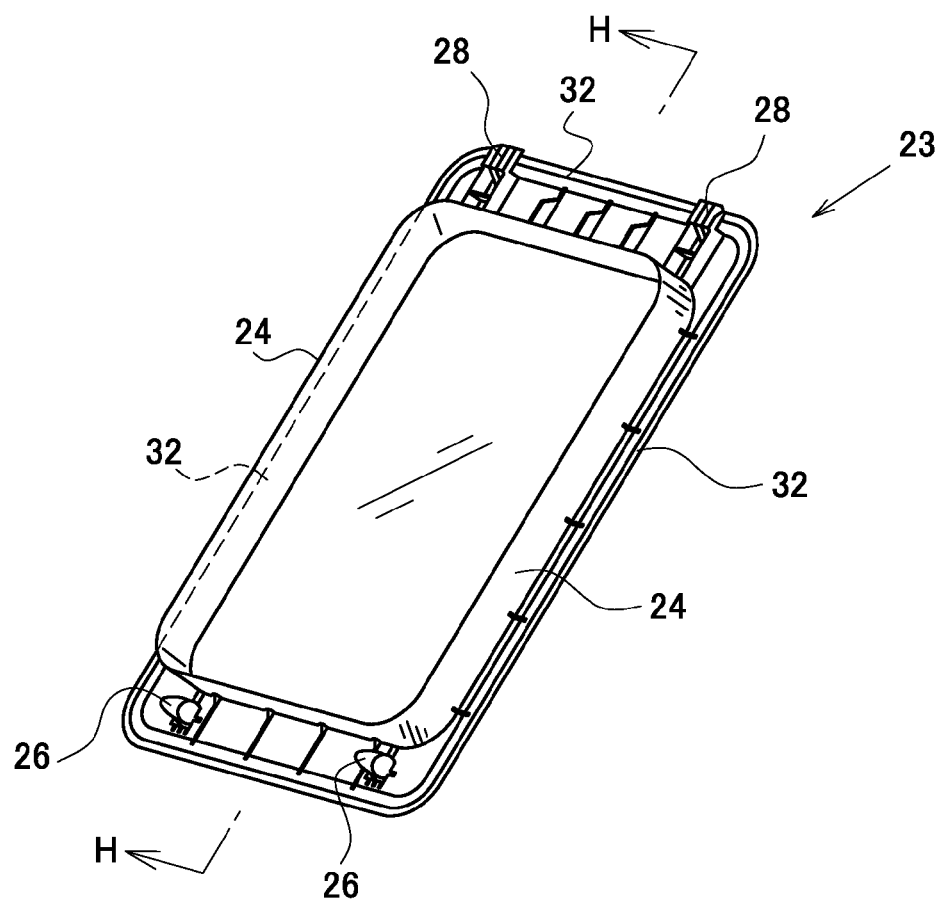
FIG. 15A is a perspective view showing the entirety of the embodiment of the cover board.
Figure 15B:
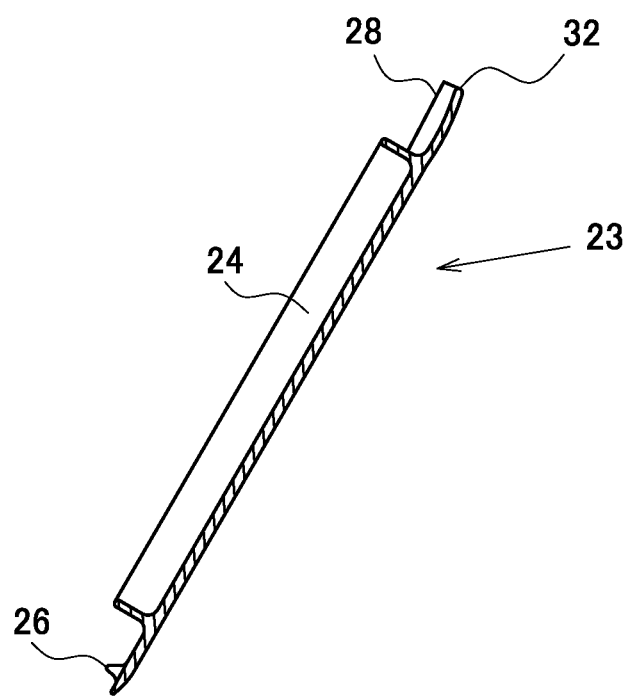
FIG. 15B is a sectional view along line H-H in FIG. 15A.

The cover board 23 has a shape like that shown in FIG. 15A and FIG. 15B. FIG. 15A is a perspective view of cover board 23 as seen from the front side (the arrow Fr direction in FIG. 6). FIG. 15B is a sectional longitudinal view along line H-H in FIG. 15A. The cover board 23 is for example a molded component made of synthetic resin.

The cover board 23 is a plate-shaped member with planar spread and at least the periphery 32 thereof being plate-shaped. The periphery 32 of the cover board 23 in this embodiment functions as an engaging section. In this embodiment, the cover board 23 is roughly rectangular, and has a frame-shaped wall 24 protruding toward the front. In addition, the cover board 23 has on the bottom edge thereof multiple (two in this embodiment) protrusions 26, and on the top edge thereof has multiple (two in this embodiment) engagement protrusions 28.

In FIG. 4, multiple (two in this embodiment) engagement holes 30 are provided in positions above the opening 11 provided in the frame 10a. In addition, multiple (two in this embodiment) position-determining holes 27 are provided in positions below the opening 11. In FIG. 13, holes 36 are provided in advance in the trim cover 17 in positions corresponding to the engagement holes 30 of the frame 10a (see FIG. 4). Through this, it is possible to contact the engagement holes 30 through the holes 36. On the other hand, holes 37 are provided in advance in the trim cover 17 in positions corresponding to the position-determining holes 27 of the frame 10a (see FIG. 4). Through this, it is possible to contact the position-determining holes 27 through the holes 37.

After the trim cover 17 is pulled into the back of the opening 11 as shown in FIG. 13, when the cover board 23 of FIG. 15A is inserted into the opening 11, the engagement protrusions 28 of the cover board 23 are plugged into (that is to say, engaged with) the engagement holes 30 of the frame 10a via the upper holes 36 in FIG. 13. Next, the protrusions 26 at the bottom of the cover board 23 of FIG. 15A are plugged into (that is to say, engaged with) the position-determining holes 27 of the frame 10a via the bottom holes 37 in FIG. 13.

When the cover board 23 is mounted on the seat back 2, a portion of the periphery 32 of the cover board 23 itself is inserted between the engagement members 19a, 19b and 19c and the trim cover 17, as shown in FIG. 7 and FIG. 10. In this state, the periphery 32 of the cover board 23 abuts, that is to say engages with, the sewn section of the engagement members 19a, 19b and 19c and the trim cover 17, and presses such to the outside of the opening 11. Through this, suitable tension is applied to the trim cover 17, so that the trim cover 17 is fixed to the surface of the cushion body 16.

After the cover board 23 is mounted on the rear surface of the seat back 2 in the above manner, the coupling hook 25a provided at the tip of the back surface carpet 18 in FIG. 14 is joined with the coupling hook 25b provided at the tip of the trim cover 17 on the bottom, and through this the rear surface of the seat back 2 is covered by the back surface carpet 18, as shown in FIG. 6.

Figure 12:
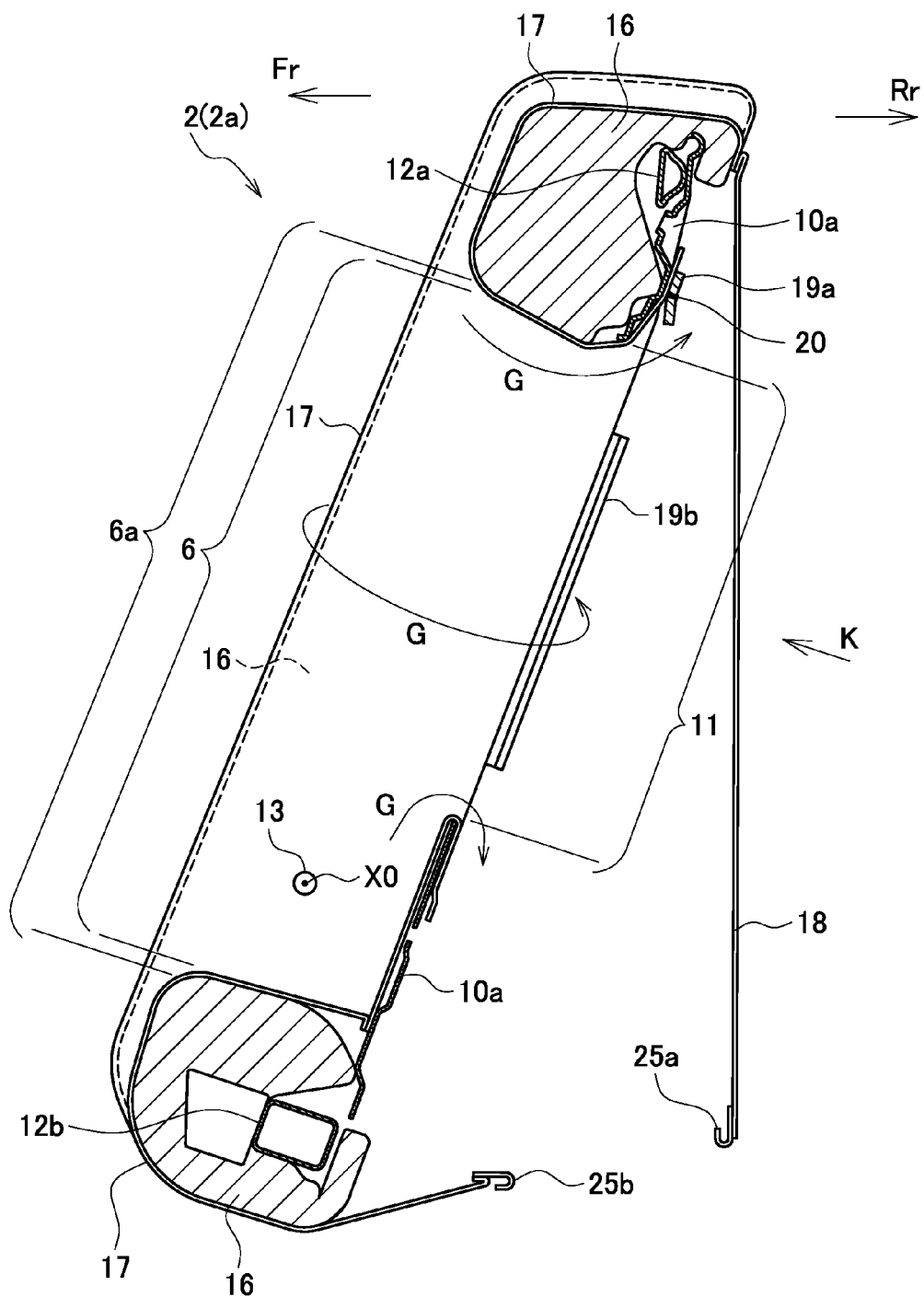
FIG. 12 is a sectional view showing the state with the trim cover placed on the cushion body of FIG. 11.

As can be understood from the above explanation, in this embodiment, in FIG. 12 the trim cover 17 is stretched from the front side to the rear side of the storage cavity 6, and furthermore, as shown in FIG. 14, by simply accomplishing the task of inserting the cover board 23 into the opening 11 while pressing and spreading the engagement member 19a, 19b and 19c (19c is not shown in FIG. 4) by means of the cover board 23, it is possible for the trim cover 17 to be fixed in a prescribed stretched state. In other words, with the embodiment, it is possible to build the fixing structure of the trim cover 17 with a simple structure.

In addition, with this embodiment, it is not necessary to provide an insert wire inside the cushion body 16, and the members used are only the engagement members 19a, 19b and 19c and the cover board 23, so it is possible to keep costs low.

Furthermore, with this embodiment, the trim cover 17 is anchored in a state with the preferable tension applied to the trim cover 17, so it is possible to securely anchor or fix the trim cover 17.

Furthermore, with this embodiment, as shown in FIG. 13 the section of the trim cover 17 that passes through the opening 11 and reaches the rear region of the cushion body 16 has an integral frame shape surrounding the opening 11, so the trim cover stretched to the rear region (that is to say, the back side region) of the opening 11 can maintain a constant shape in a natural state, so that the shape does not collapse. Consequently, the work of mounting the cover board 23 (see FIG. 10 and FIG. 15A) on the opening 11 via the trim cover 17 after the trim cover 17 is stretched to the rear region of the opening 11 becomes extremely easy to do.

(Split Rear Seat Structure)

Application of the trim cover fixing structure of this embodiment to a split rear seat structure is extremely easy. The split rear seat structure is for example disclosed in Japanese Patent Laid-Open Publication No. 2011-168115, which is cited as Patent Literature 4 in this specification. In the disclosure of Japanese Patent Laid-Open Publication No. 2011-168115, the split rear seat structure is built using an opening similar to the opening shown in FIG. 6 of the present application (reference sign 18 in FIG. 2 of Patent Literature 4), a frame 29 shown in FIG. 16A of the present application (reference sign 20 in FIG. 4 of Patent Literature 4) and a lid 31 shown in FIG. 17A of the present application (reference sign 16 in FIG. 5 of Patent Literature 4).

Figure 16A:
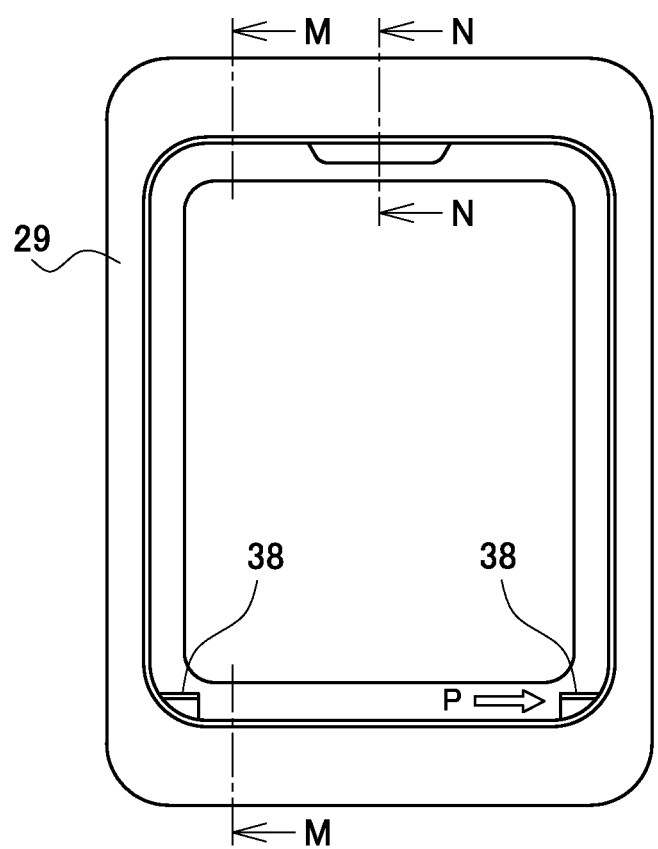
FIG. 16A is a plan view showing the entirety of an embodiment of a removable frame on the back surface of the seat back of FIG. 6.
Figure 16B:
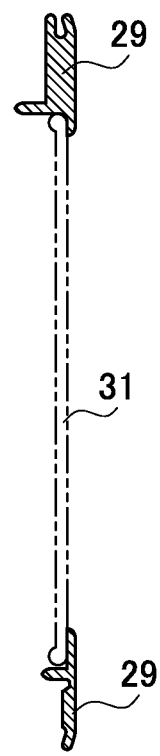
FIG. 16B is a sectional view along line M-M of FIG. 16A.
Figure 16C:
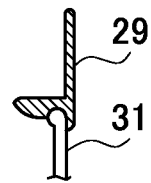
FIG. 16C is a sectional view along line N-N in FIG. 16A.
Figure 16D:
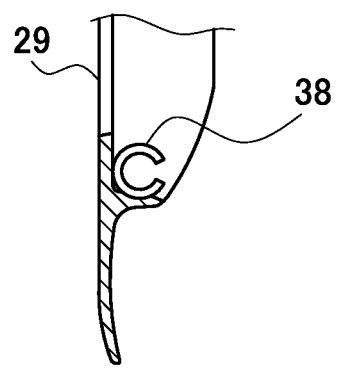
FIG. 16D show an enlargement of the section indicated by arrow P in FIG. 16A.
Figure 17A:
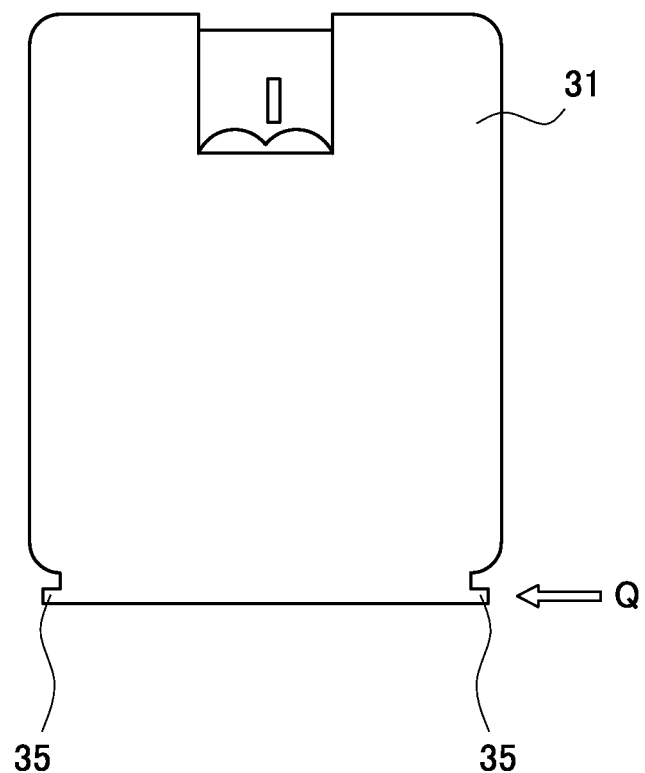
FIG. 17A is a plan view showing the entirety of the lid supported at the location of arrow P in FIG. 16A.
Figure 17B:
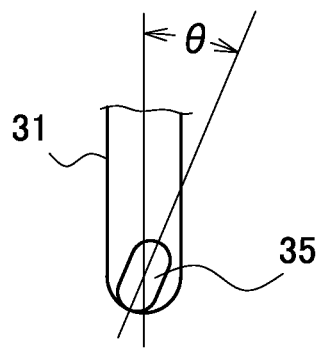
FIG. 17B is a partial enlargement in accordance with arrow Q in FIG. 17A.

As shown in FIG. 17A and FIG. 17B, the lid 31 has a support shaft 35 at the bottom edge thereof. On the other hand, as shown in FIG. 16A and FIG. 16D, a shaft housing unit 38 is provided at the bottom of the frame 29. By inserting the support shaft 35 of the lid 31 into the shaft housing unit 38 of the frame 29, it is possible to mount the lid 31 on the frame 29, as shown in FIG. 16B and FIG. 16C. Through the cooperative action of the support shaft 35 and the shaft housing unit 38, it is possible for the lid 31 to open and close relative to the frame 29.

With the present embodiment, when manufacturing a vehicle seat, it is possible to build a split rear seat structure by merely implementing the extremely simple process of attaching the frame 29 to the rear surface of the seat back 2 as shown in FIG. 16A in place of the cover board 23 in FIG. 6, attaching the lid 31 of FIG. 17A so as to be openable and closeable on the frame 29, and further providing an opening in a corresponding position of the back surface carpet 18 of FIG. 6.

Modification Examples (1) In FIG. 10, the engagement members 19a, 19b and 19c were provided in three locations on the top side and the left and right sides of the opening 11 provided in the frame 10a and the engagement members 19a, 19b and 19c are spread out by the periphery 32 of the three sides of the cover board 23. However, in place of this, it is possible to utilize a structure in which an engagement member is provided in at least one location out of the four sides of the cover board 23 and for this to be spread out by the cover board 23.

(2) In FIG. 7 of this embodiment, the periphery 32 of the cover board 23 is engaged with the section where the trim cover 17 and the engagement member 19a are sewn together, in a state in which the periphery 32 of the cover board 23 is inserted between the engagement member 19a and the trim cover 17. However, in place of this, it is possible to abut the tip of the periphery 32 of the cover board 23 against the edge surface 19x of the engagement member 19a and spread out the engagement member 19a, without inserting the periphery 32 of the cover board 23 between the engagement member 19a and the trim cover 17.

(3) In this embodiment, the engagement members 19a, 19b and 19c were used as "engagement units of the trim cover 17" and the periphery 32 of the cover board 23 was used as an "engaging unit for the cover board 23" However, in place of this it is possible to use hooks or clips anchored to the trim cover as "engagement units of the trim cover 17", and holes provided in the cover board as "engaging units of the cover board 23". In addition, it is possible to use holes provided in the trim cover as "engagement units of the trim cover 17" and protrusions provided in the cover board as "engaging units of the cover board 23". Here, the hooks or clips are components with an arbitrary shape that can engage with the cover board.

Figure 19:
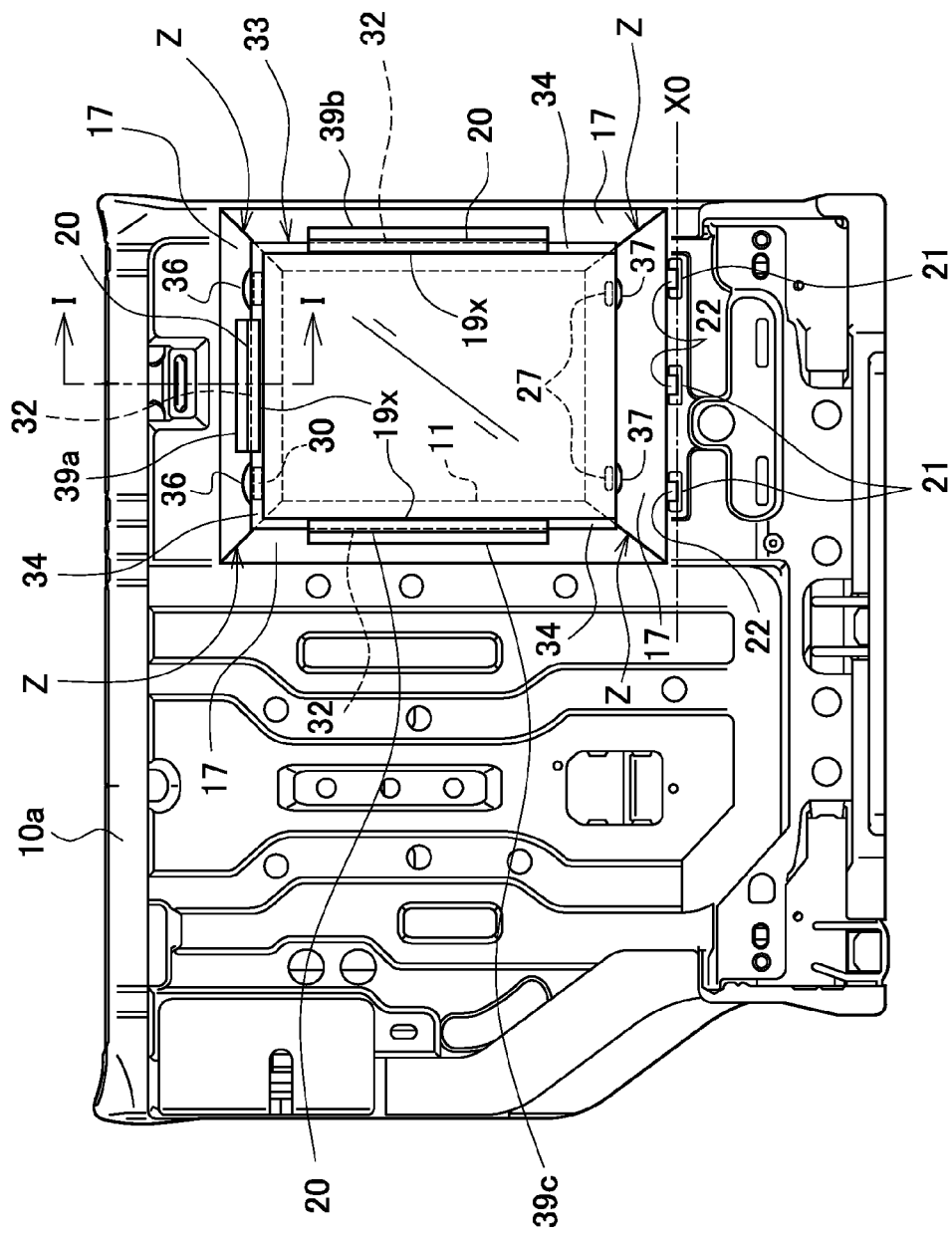
FIG. 19 is a plan view of the entirety of a frame provided inside the seat back of FIG. 18.

Second Embodiment of the Trim Cover Fixing Structure and Vehicle Seat According to the Present Invention FIG. 18 and FIG. 19 show the primary sections of a second embodiment of the trim cover fixing structure and vehicle seat according to the present invention. FIG. 18 is a sectional view along line I-I in FIG. 19. These drawings respectively correspond to FIG. 7 and FIG. 10 in the first embodiment.

The point where this embodiment differs from the first embodiment shown in FIG. 7 and FIG. 10 is that in FIG. 18 and FIG. 19, a step 34 is provided on the periphery 32 of the cover board 33 as an fixing member. Engagement members 39a, 39b and 39c are provided inside a thin section formed by the step 34 (that is to say, are placed on the thin section).

In the first embodiment, no step is provided in the cover board 23 as shown in FIG. 7, so the engagement members 19a, 19b and 19c placed on the periphery of the cover board 23 protrude significantly to the rear (Rr direction) side of the seat back 2. Consequently, when a passenger contacts the back surface carpet 18, there are concerns that an uncomfortable feeling may be felt where there is stretching at the location of the engagement members 19a, 19b and 19c. In contrast, in the second embodiment shown in FIG. 18, the engagement member 39a, 39b and 39c are in the thin section at the location of the step 34 and do not protrude significantly to the outside, so even if a passenger contacts that section via the back surface carpet 18, no uncomfortable feeling is felt.

Figure 20:
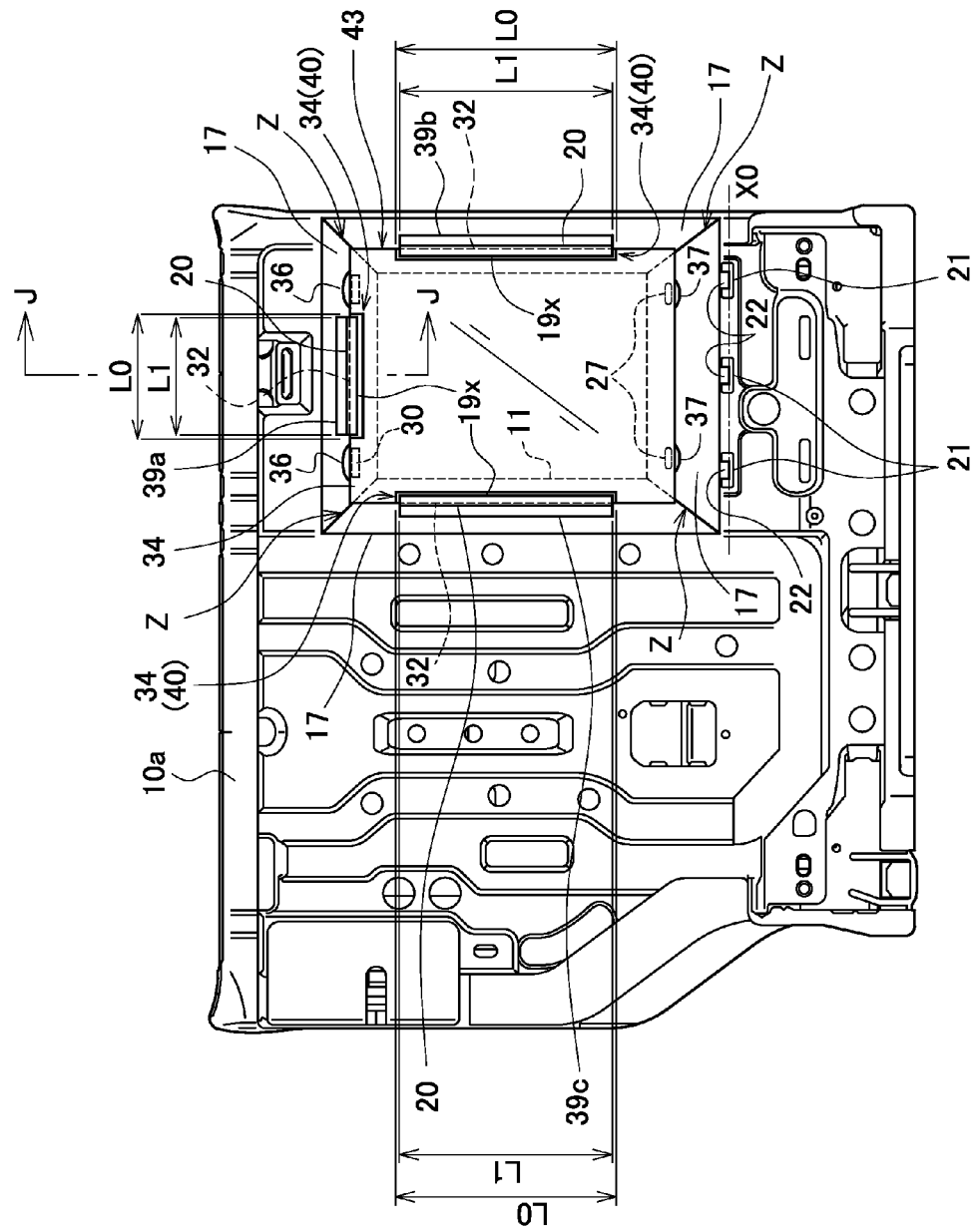
FIG. 20 is a plan view of a frame that is a necessary component of still another embodiment of the vehicle seat and trim cover fixing structure according to the present invention.

Third Embodiment of the Trim Cover Fixing Structure and Vehicle Seat According to the Present Invention FIG. 20 shows the primary sections of a third embodiment of the trim cover fixing structure and vehicle seat according to the present invention. The cross-sectional structure along line J-J in FIG. 20 is the same as the cross-sectional structure shown in FIG. 18.

In this embodiment, the fact that the engagement members 39a, 39b and 39c are housed in the thin section at the location of the step 34 provided in a cover board 43 as fixing members is the same as in the case of the embodiment shown in FIG. 19. In the embodiment of FIG. 19, the entire perimeter of the periphery of the cover board 33 is the step 34. In contrast, as shown in FIG. 20 with this embodiment the step 34 is formed by a step indentation or groove 40 provided in sections on the periphery of the cover board 43. The length L0 of the step indentation or groove 40 is set as a length slightly larger than the length L1 of the engagement members 39a, 39b and 39c.

Consequently, a wall formed by the step indentation or groove 40 prevents the engagement members 39a, 39b and 39c from moving relative to the cover board 43. In the embodiment shown in FIG. 19, the step 34 is formed on the entire perimeter or the periphery of the cover board 33, so there is the fear that the engagement members 39a, 39b and 39c could move relative to the cover board 33 and wrinkles could occur in the trim cover 17. In contrast, in this embodiment, as a result of the wall formed by the step indentation or groove 40, the engagement members 39a, 39b and 39c are prevented from shifting positions. Through this, it is possible to prevent wrinkles from occurring in the trim cover 17.

Figure 21:
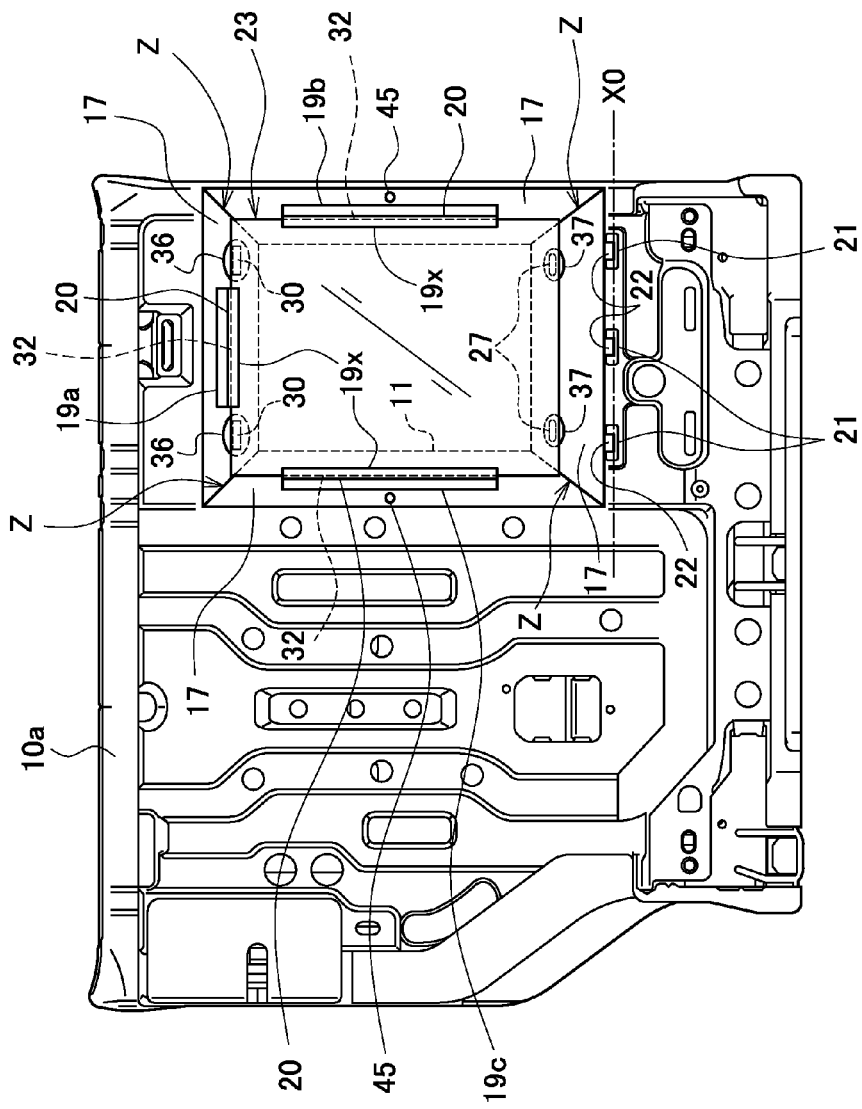
FIG. 21 is a plan view showing a modification example of the embodiment shown in FIG. 10.

Fourth Embodiment of the Trim Cover Fixing Structure and Vehicle Seat According to the Present Disclosure FIG. 21 shows the primary sections of a fourth embodiment of the trim cover fixing structure and vehicle seat according to the present invention. These primary sections correspond to sections shown in FIG. 10 in the first embodiment. The point where the embodiment shown in FIG. 21 differs from the previous embodiment shown in FIG. 10 is that as shown in FIG. 21, opening holes 45 are provided in advance in sections to the outside of the engagement members 19b and 19c on the left and right side edges of the trim cover 17.

Figure 22:
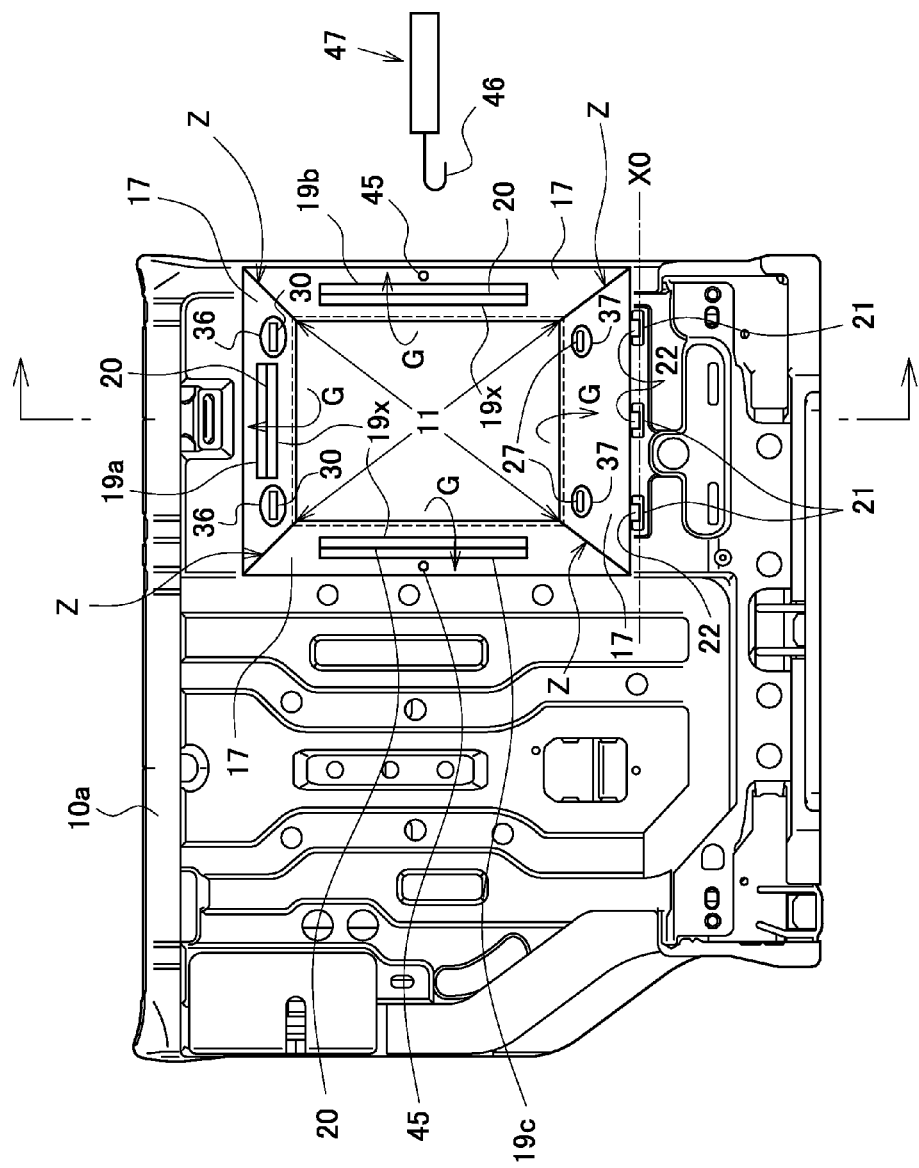
FIG. 22 is a view showing a method of applying the embodiment shown in FIG. 21.

When a portion of the periphery 32 of the cover board 23 is inserted between the engagement members 19b and 19c on the side edges and the trim cover 17 in FIG. 21, in FIG. 22 if a hook member 46 of an opening tool 47 provided with the hook member 46 on the tip is inserted into the opening hole 45 and the side edges of the trim cover 17 are stretched to the outside by the opening tool 47, the work of inserting the periphery 32 of the cover board 23 between the engagement members 19b and 19c and the trim cover 17 is easily accomplished.

Figure 23:
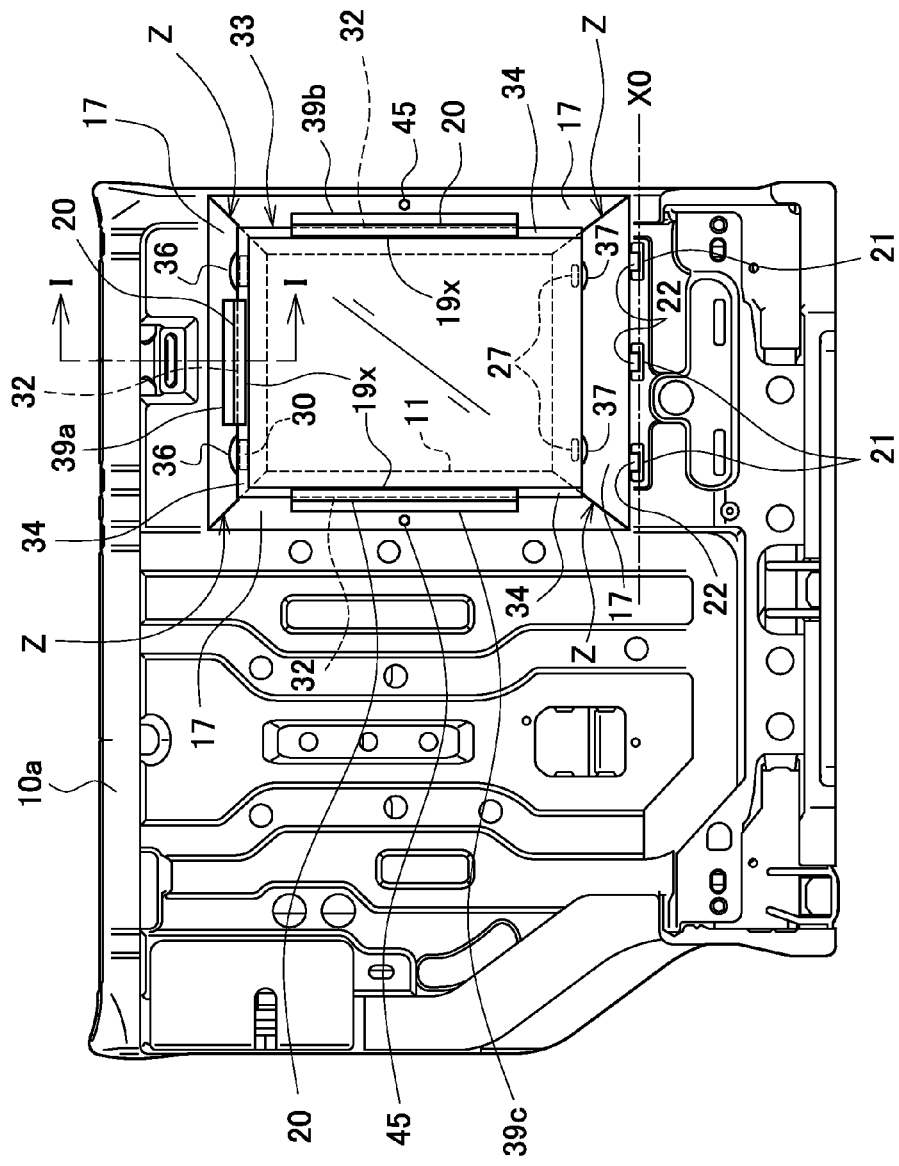
FIG. 23 is a plan view showing a modification example of the embodiment shown in FIG. 19.

In the prior embodiment shown in FIG. 19, the step 34 was provided on the periphery 32 of the cover board 33 as a fixing member. In this embodiment also, it is possible to provide the opening holes 45 as shown in FIG. 21. In this case, a structure such as that shown in FIG. 23 results.

Figure 24:
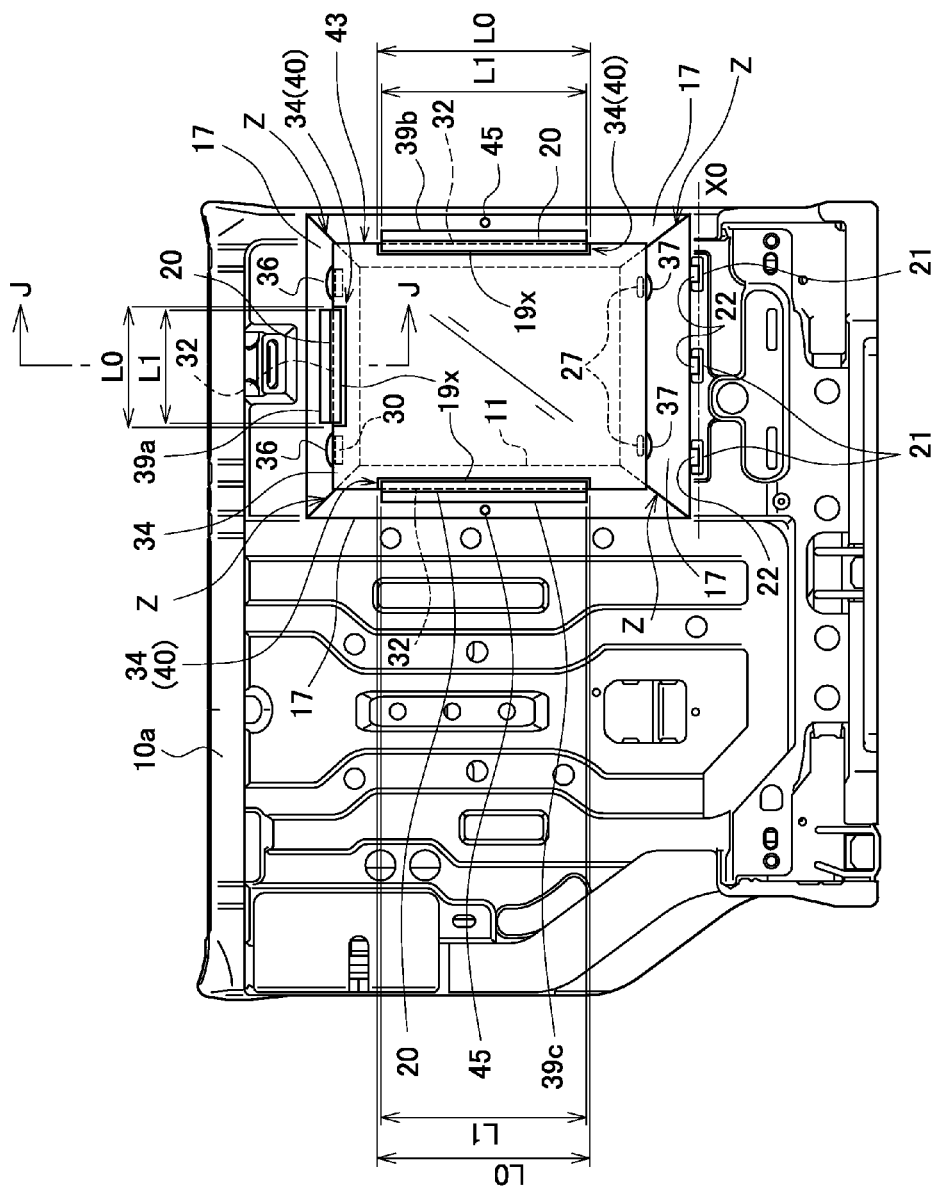
FIG. 24 is a plan view showing a modification example of the embodiment shown in FIG. 20.

Furthermore, in the prior exemplary embodiment shown in FIG. 20, the step 34 was formed by providing the step indentation or groove 40 on the periphery 32 of the cover board 43. In this embodiment as well, it is possible to form the opening holes 45 as shown in FIG. 21. In this case, a structure such as that shown in FIG. 24 results.

Other Embodiments

The present invention has been described with reference the preferable embodiment, but the invention is not limited thereto and a variety of changes can be made thereto within the scope of the invention set forth in the claims.

For example, in the above embodiments, the present invention was applied to a trim cover fixing structure in the location of the storage cavity 6 for storing the arm rest 7 of the seat back 2 in FIG. 2, but the present invention can also be applied to a trim cover fixing structure at locations other than the arm rest storage cavity.

In addition, the present invention can be applied to a trim cover fixing structure at locations besides the seat back 2 of the vehicle seat 1.

The invention claimed is:

1. A trim cover fixing structure used in a vehicle seat that comprises a cushion body having elasticity and a trim cover covering the cushion body, the trim cover fixing structure comprising:
   an engagement member provided near an edge of the trim cover;
   a fixing member provided with an engaging section configured to engage with the engagement member on the trim cover in a state in which the cushion body is covered; and
   an opening for pulling out the trim cover from a front side to a rear side,
   wherein:
      the fixing member is fitted into the rear side of the opening,
      the engaging section is provided to the fixing member so as to be positioned outward of the opening,
      the engaging section of the fixing member engages with the engagement member to push the engagement member outward in a direction to the outside of the opening and apply tension to the trim covering the cushion body, and
      the trim cover is fixed to the surface of the cushion body in a state with the tension applied.

2. The trim cover fixing structure according to claim 1, wherein the fixing member comprises a plate-shaped member that spreads out in a planar manner and at least a periphery of which is plate-shaped, and the periphery of the plate-shaped member engages with the engagement member.

3. The trim cover fixing structure according to claim 2, wherein the periphery of the fixing member engages with the engagement member in a state of being inserted between the engagement member and the trim cover.

4. The trim cover fixing structure according to claim 3, wherein the fixing member has a step in a section inserted between the engagement member and the trim cover, and the engagement member is inserted into a thin section formed by this step.

5. The trim cover fixing structure according to claim 4, wherein the step is formed by a step indentation provided on the periphery of the fixing member, and a wall formed by the step indentation restricts movement of the engagement member relative to the fixing member.

6. The trim cover fixing structure according to claim 1, wherein the engagement member is sewn to the trim cover.

7. The trim cover fixing structure according to claim 1, wherein the engagement member comprises a narrow band-shaped member having, in a plan view, a long side and a short side, and the long side of the band-shaped member engages with the fixing member.

8. The trim cover fixing structure according to claim 1, wherein the engagement member comprises felt, press felt or non-woven cloth.

9. The trim cover fixing structure according to claim 1, further comprising:
   a storage cavity that comprises a storage cavity formed with the trim cover covering the cushion body as a wall and is provided with an opening connecting a front region of the cushion body with a rear region of the cushion body; and
   a moving member movable between a position stored in the storage cavity and a position extending to an outside of the storage cavity,
   wherein:
      the trim cover is provided so as to reach to the rear region of the cushion body from the front region of the cushion body through the storage cavity and the opening,
      the engagement member is mounted on the trim cover in a section that reaches to the rear region of the cushion body,
      the fixing member comprises a cover board configured to cover the opening of the storage cavity from a rear side of the cushion body, and
      when the cover board is placed at a position covering the opening of the storage cavity, a periphery of the cover board engages with the engagement member.

10. The trim cover fixing structure according to claim 9, wherein:
   the engagement member is mounted on the trim cover at the section that reaches to the rear region of the cushion body at least on both left and right sides of the opening provided in the storage cavity, and
   the cover board of the fixing member engages with the engagement member in the periphery on both right and left sides and applies tension to the trim cover.

11. The trim cover fixing structure according to claim 10, wherein the moving member comprises an arm rest and/or a side table.

12. A vehicle seat comprising a cushion body having elasticity, a trim cover for covering the cushion body, and a trim cover fixing structure configured to fix the trim cover to the cushion body,
   wherein the trim fixing structure comprises the trim cover fixing structure according to claim 1.

13. A trim cover fixing structure, comprising:
   a cushion body having elasticity;
   a trim cover configured to cover the cushion body; and
   an opening configured to connect a front region of the cushion body with a rear region of the cushion body,
   wherein:
      the trim cover is provided so as to reach to the rear region of the cushion body from the front region of the cushion body through the opening,
      an engagement member is provided near an edge of the trim cover reaching to the rear region of the cushion body,
      a cover board for covering the opening from a rear side of the cushion body is provided,
      an engaging section is provided in the cover board, the engaging section being provided in the cover board so as to be positioned outward of the opening,
      the engagement member is pushed outward in a direction to an outside of the opening and tension is applied to the trim cover covering the cushion body by the engaging section engaging with the engagement member when the cover board is placed at a position covering the opening, and in a state with the tension applied, the trim cover is fixed to a surface of the cushion body, and
      a section of the trim cover that reaches to the rear region of the cushion body through the opening is a single frame shape surrounding the opening.

14. The trim cover fixing structure according to claim 13, wherein the trim cover that reaches to the rear region of the cushion body through the opening comprises a plurality of sections sewn together to form the single frame shape surrounding the opening.

15. The trim cover fixing structure according to claim 14, wherein:
- the cushion body is supported by a frame,
- a connecting member is provided at the section of the trim cover that reaches to the rear region of the cushion body through the opening, and
- the connecting member is connected to the frame.

16. The trim cover fixing structure according to claim 15, wherein at the section of the trim cover that reaches to the rear region of the cushion body through the opening, an opening hole is provided in a section to the outside of the engagement member into which opening hole can be inserted a tip of a tool, for purpose of facilitating an inserting of the periphery of the cover board between the engagement members and the trim cover.

* * * * *